(12) United States Patent
Jun

(10) Patent No.: US 12,266,025 B2
(45) Date of Patent: Apr. 1, 2025

(54) METER READING DEVICE, ATTACHMENT MEMBER, AND REMOTE METER READING SYSTEM

(71) Applicant: ASIOT CO., LTD., Tokyo (JP)

(72) Inventor: Yang Jun, Tokyo (JP)

(73) Assignee: Asiot Co., Ltd., Tokyo (JP)

( * ) Notice: Subject to any disclaimer, the term of this patent is extended or adjusted under 35 U.S.C. 154(b) by 608 days.

(21) Appl. No.: 17/626,565

(22) PCT Filed: Jul. 17, 2020

(86) PCT No.: PCT/JP2020/027841
§ 371 (c)(1),
(2) Date: Jan. 12, 2022

(87) PCT Pub. No.: WO2021/010464
PCT Pub. Date: Jan. 21, 2021

(65) Prior Publication Data
US 2022/0335544 A1    Oct. 20, 2022

(30) Foreign Application Priority Data

Jul. 17, 2019  (JP) ................................. 2019-131618

(51) Int. Cl.
*G06Q 50/06*       (2024.01)
*G06T 7/00*        (2017.01)
(52) U.S. Cl.
CPC ........... *G06Q 50/06* (2013.01); *G06T 7/0004* (2013.01)

(58) Field of Classification Search
CPC ....... G06Q 50/06; G06T 7/0004; Y04S 20/30; G08C 19/36; H04Q 9/00
See application file for complete search history.

(56) References Cited

U.S. PATENT DOCUMENTS

2019/0173312 A1*  6/2019  Kumar ...................... H02J 1/14

FOREIGN PATENT DOCUMENTS

| CN | 103618878 A | 3/2014 |
|----|-------------|--------|
| CN | 208623829 U | 3/2019 |
| CN | 110021158 A | 7/2019 |
| EP | 1596164 A1  | 11/2015 |

(Continued)

OTHER PUBLICATIONS

English Translation of DE-10032755-A1 (Year: 2002).*

(Continued)

*Primary Examiner* — Charles R Kasenge
(74) *Attorney, Agent, or Firm* — Vedder Price P.C.

(57) ABSTRACT

Provided are a meter reading device, an attachment member, and a remote meter reading system. The meter reading device includes a recognition unit configured to recognize a measurement value measured by a meter device from an image picked up by a camera and generate numerical data indicating the recognized measurement value, a transmission unit configured to transmit the numerical data generated by the recognition unit to a storage device installed on a network, a mirror arranged so as to be opposed to a display surface at a given angle, and other components. The attachment member enables attachment of the meter reading device to the meter device. The remote meter reading system allows the measurement value displayed on an existing meter device to be checked at a remote location.

1 Claim, 28 Drawing Sheets

(56) References Cited

FOREIGN PATENT DOCUMENTS

| | | | | | |
|---|---|---|---|---|---|
| JP | 2002-288778 | A | | 10/2002 | |
| JP | 2002-350211 | A | | 12/2002 | |
| JP | 2009-037580 | A | | 2/2009 | |
| JP | 2012-208763 | A | | 10/2012 | |
| JP | 2019007897 | A | * | 1/2019 | |
| KR | 200289754 | | * | 9/2002 | |
| KR | 20050085922 | A | * | 8/2005 | |
| WO | 2007067132 | A1 | | 6/2007 | |
| WO | WO-2012104434 | A1 | * | 8/2012 | ............ G01D 4/008 |
| WO | 2018-056436 | A1 | | 3/2018 | |

OTHER PUBLICATIONS

English Translation of KR 20050085922 (Year: 2005).*
English Translation of WO 2012104434 (Year: 2012).*
English Translation of "JP-2019007897-A" (Year: 2019).*
English Translation of International Preliminary Report on Patentability filed in PCT200717A; 5 pages.
Japanese International Preliminary Report on Patentability filed in PCT200717A; 5 pages.
English Translation of International Search Report filed in PCT/JP2020/027841; 2 pages.
Japanese International Search Report filed in PCT/JP2020/027841; 4 pages.
English Translation of the Written Opinion of the International Search Authority mailed Sep. 8, 2020 in PCT200717A; 4 pages.
Japanese Written Opinion of the International Search Authority mailed Sep. 8, 2020 in PCT200717A; 4 pages.
English Version of Notice of Reasons for Refusal dated Mar. 29, 2021 filed in Japanese Application No. 2020-564779; 7 pages.
Japanese Notice of Reasons for Refusal dated Mar. 29, 2021 filed in Japanese Application No. 2020-564779; 8 pages.
Written Opinion of the Intellectual Property Office of Singapore filed in Application No. 11202260264P dated Aug. 22, 2023; 8 pgs.

* cited by examiner

METER READING DEVICE, ATTACHMENT MEMBER, AND REMOTE METER READING SYSTEM

TECHNICAL FIELD

The present invention relates to a meter reading device that is used after being attached to an existing meter device that measures usage of an energy supply medium such as water, gas, or electricity, an attachment member for a meter reading device, and to a remote meter reading system using the meter reading device.

BACKGROUND ART

Hitherto, an existing meter device that measures usage of an energy supply medium supplied through public utilities is installed for each residence. The usage of an energy supply medium is checked by a meter reader who visually reads a measurement value displayed on the meter device at each residence.

CITATION LIST

Patent Literature

[PTL 1] JP 2002-350211 A

SUMMARY OF INVENTION

Technical Problem

However, it takes long time for a meter reader to visit each residence to read a meter. Further, time and effort are also needed to aggregate collected data.

Further, there is a problem in that a large number of existing meter devices without a means of transmitting data are used.

Solution to Problem

In view of the above-mentioned circumstances, as a measure for solving the problems described above, according to the present invention, there is provided a meter reading device is a meter reading device that reads a measurement value from an existing meter device having a display surface, which measures usage of an energy supply medium such as water, gas, or electricity and displays the measurement value on the display surface, the meter reading device including: a camera configured to pick up an image of an image pickup range including the display surface; a casing configured to accommodate the camera; an opening formed in a rear surface of the casing; a mirror provided inside the casing, the mirror being arranged so as to be opposed to the display surface at a given angle, and being configured to reflect light that has been reflected by the display surface and has passed through the opening, the camera being configured to receive the light reflected by the mirror to pick up the image of the image pickup range; a recognition unit configured to recognize the measurement value measured by the meter device from image data obtained through image pickup by the camera and generate numerical data indicating the recognized measurement value; and a storage device configured to store the image data or the numerical data. It is preferred that the storage device be formed of, for example, a semiconductor memory medium. The storage device may be installed inside the casing of the meter reading device, inside a sub-casing described later, or on a network. A combination of storage devices provided at the above-mentioned locations may also be used. It is preferred that the mirror be a semi-reflective mirror. When a semi-reflective mirror is used as the mirror, the light from the display surface can be picked up by the camera without rotationally driving the mirror. At the same time, the measurement value displayed on the display surface can be visually checked from an outside of the casing.

Further, it is preferred that the meter reading device further include a transmission unit configured to transmit the image data or the numerical data to a storage device installed on a network, and that the transmission unit transmit the image data or the numerical data based on low power wide area (LPWA) standards. When the data is transmitted based on the LPWA standards, an operation of the meter reading device can be performed with reduced power consumption. Thus, when the meter reading device is driven with a battery, a life of the battery can be prolonged.

Further, it is also preferred that the meter reading device include the sub-casing, which is configured to accommodate the recognition unit, and is separate from the casing that accommodates the camera and the mirror.

Further, it is also preferred that the recognition unit include: a character analysis unit configured to perform image analysis on the image to extract a character-shape feature representing the measurement value included in the image pickup range; a conversion unit configured to derive a specific character from the character-shape feature being input in association with a kind of the character-shape feature to the learned recognition unit, and convert the specific character into character data; and a numerical-data generating unit configured to generate the numerical data based on the character data used as a character string corresponding to the measurement value. Further, it is preferred that the recognition unit perform an artificial intelligence (AI) model via an over-the-air (OTA) to enable improvement of recognition accuracy of the numerical data. When the conversion unit cannot derive a specific character and it is determined that the recognition has failed, the recognition unit uploads the image data into the storage device provided in a server. The AI model performs incremental learning from previous image data accumulated in the storage device in the server to perform relearning to thereby enable a specific character to be derived.

Further, according to the present invention, there is provided a remote meter reading system, including: the meter reading device; and a data acquisition means configured to acquire the numerical data from the storage device.

Further, it is also preferred that the storage device be provided in a cloud.

Further, it is also preferred that the remote meter reading system further include an output unit configured to output the numerical data acquired by the data acquisition means.

Further, according to the present invention, there is provided an attachment member that enables attachment of a meter reading device to an existing meter device having a display surface, which measures usage of an energy supply medium such as water, gas, or electricity and displays a measurement value on the display surface, the attachment member including: a holding frame configured to hold the meter reading device; and a fixing member, which is connected to the holding frame and includes gripping portions being removably fixable to the meter device, wherein the holding frame is connected to the fixing member so as to be turnable about an axis perpendicular to a plane opposed to the display surface as a rotation axis with respect to the fixing member.

Further, according to the present invention, there is provided an attachment member that enables attachment of a meter reading device to an existing meter device, which measures usage of an energy supply medium such as water, gas, or electricity and displays the measurement value on a display surface, the meter reading device including a casing and a camera that is provided inside the casing to read the measurement value displayed on the display surface through an opening formed in a rear surface of the casing, the attachment member including: a holding frame capable of holding the meter reading device, and has an open window formed at a position that allows the open window to communicate with the opening; and a fixing screw hole formed in an outer peripheral surface of the holding frame, and enables fixing of an external fixing tool with use of a screw.

Even when there is an obstacle such as a pipe in proximity to the meter device and the obstacle prevents the meter reading device from being directly fixed to the meter device, the attachment member having the fixing screw hole enables the meter reading device to be held while the meter reading device is being in contact with a front surface of the meter device. As a result, an image of the measurement value displayed on the meter device can be picked up, and the measurement value can be read.

Further, it is also preferred that the holding frame of the attachment member according to the present invention have belt insertion holes that allow mounting of a belt that fixes the attachment member and the meter device together. It is preferred that the fixing belt inserted through the belt insertion holes be looped over, for example, protruding portions of the meter device to be fixed thereto. Further, it is also preferred that the belt be wound around a body portion of the meter device to bundle the holding frame and the meter device together to fix the holding frame and the meter device to each other with a tensile force. The belt enables firm and close contact between the attachment member and the meter device, and can prevent a positional shift of a character displayed on the display surface with respect to the meter reading device, which may occur with elapse of time. As a result, a reduction in visibility of the meter reading device can be prevented.

Further, it is also preferred that the attachment member according to the present invention include a light-blocking cover. The light-blocking cover has a plate-like shape with a height in a vertical direction larger than that of the front surface of the meter reading device being held inside the holding frame, and is provided in connection with the holding frame. The light-blocking cover can prevent external light such as sunlight from entering the opening of the meter reading device, and thus can prevent a reduction in visibility of a character displayed on the display surface of the meter reading device, which may be caused by scattering of the external light.

Still further, it is also preferred that the attachment member according to the present invention include: a transparent plate that covers the open window; and a transparent resin sheet being adhesive to a rear surface of the transparent plate, and that the transparent resin sheet have an adhesive mounting surface that covers the display surface of the meter device and is adhesive to the display surface under a state in which the adhesive mounting surface is bonded to the transparent plate. The transparent resin sheet bonded between the display surface and the transparent plate can prevent dew condensation and water intrusion between the attachment member and the display surface, and thus can prevent a reduction in visibility of a character displayed on the display surface of the meter reading device. It is preferred that the transparent resin sheet be made of a transparent acrylic resin. The acrylic resin is preferred because the acrylic resin has high transparency to visible light.

Advantageous Effects of Invention

According to the present invention, the meter reading device and the remote meter reading system that enable the measurement value displayed on the existing meter device to be checked at a remote location can be achieved.

Further, the remote meter reading system improves a character recognition rate for the numerical data through the AI to increase accuracy of acquired data.

Still further, the attachment member according to the present invention enables attachment of the meter reading device to the meter device at a proper angular position with respect to the meter device.

BRIEF DESCRIPTION OF DRAWINGS

FIG. 11 are views for illustrating an outline of a system that transmits numerical data (D) from meter devices (2) installed in an apartment unit via a meter reading device (1) to a storage device (19), in which FIG. 11(a) is an illustration of a case in which the numerical data (D) is transmitted from an individual meter reading device (1), and FIG. 11(b) is an illustration of a case in which a sub-casing (66) is provided outside the meter reading device (1) and the numerical data (D) is transmitted from a recognition unit (17) and a transmission unit (18), which are accommodated in the sub-casing (66).

DESCRIPTION OF THE EMBODIMENT

Figure 1:
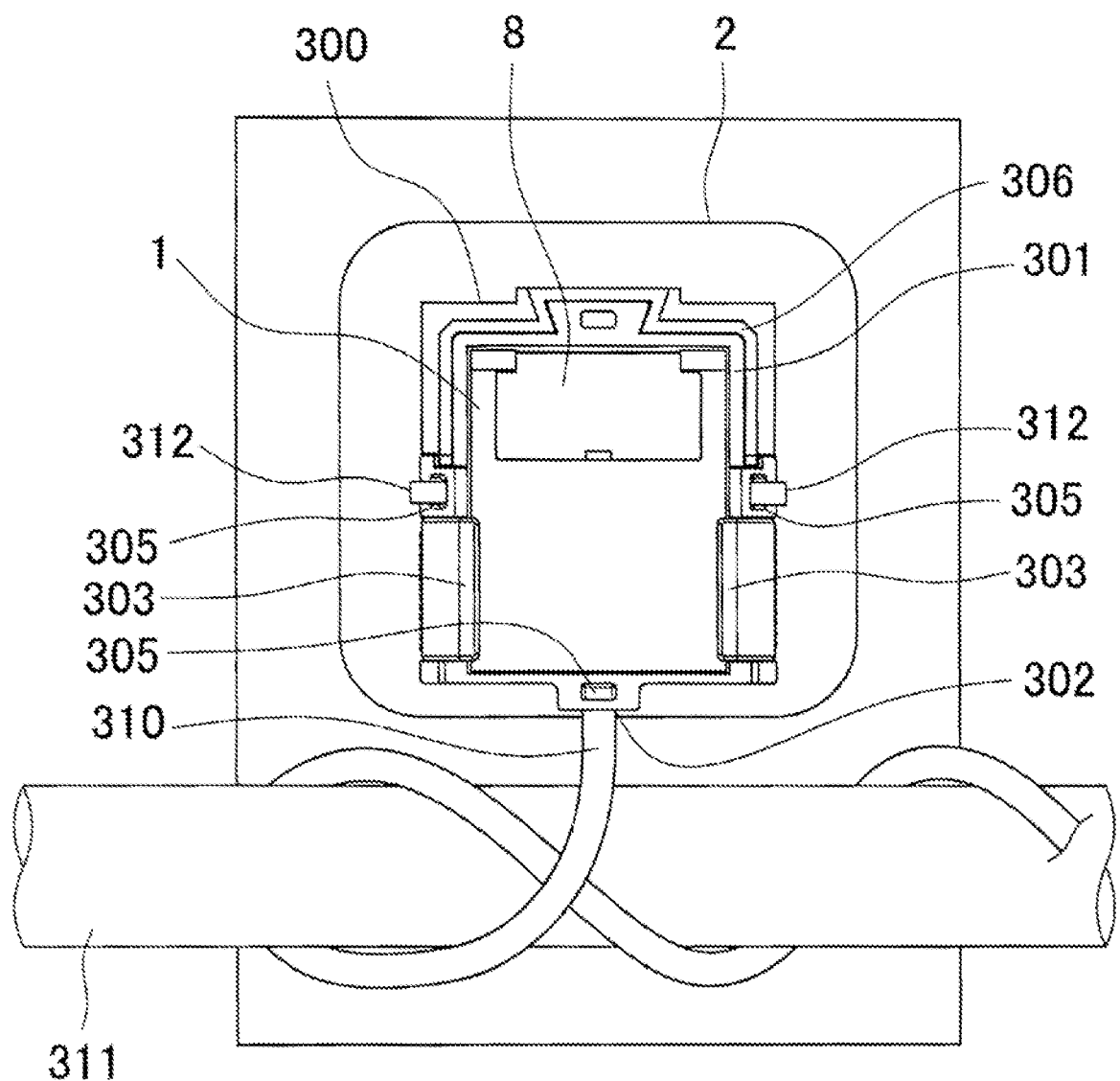
FIG. 1 is a perspective view for illustrating an entire meter reading device (1) according to a first embodiment when viewed from a front side.

Now, embodiments of the present invention are described in detail with reference to the accompanying drawings. Components having substantially the same functions and configurations are denoted by the same reference symbols in this specification and the drawings, and an overlapping description thereof is herein omitted.

First Embodiment

A meter reading device 1 according to the present invention is used after being attached to an existing meter device 2 through intermediation of an attachment member 100. The existing meter device 2 measures usage of an energy supply medium such as water, gas, or electricity.

The meter device 2 includes a conduit pipe 2a and a measurement unit 2b. The conduit pipe 2a allows the energy supply medium to flow therethrough. The measurement unit 2b measures the amount of flow of the energy supply medium that is flowing. The measurement unit 2b has a display surface 2c on which a measurement value T of the measured amount of flow of the energy supply medium is displayed. Further, when closed, a lid member 2e can cover the display surface 2c.

As illustrated in FIG. 1, the meter reading device 1 includes a casing 6. The casing 6 has a check window 8 that is formed in a front surface so as to be located closer to a distal end side of the casing 6. The check window 8 can be opened and closed by a lid 7. The lid 7 is pivotably supported by a spindle 7a provided at a distal end edge of the front surface of the casing 6. The check window 8 can be exposed by pushing up a tab 7b with a finger to outwardly open the lid 7.

Figure 2:
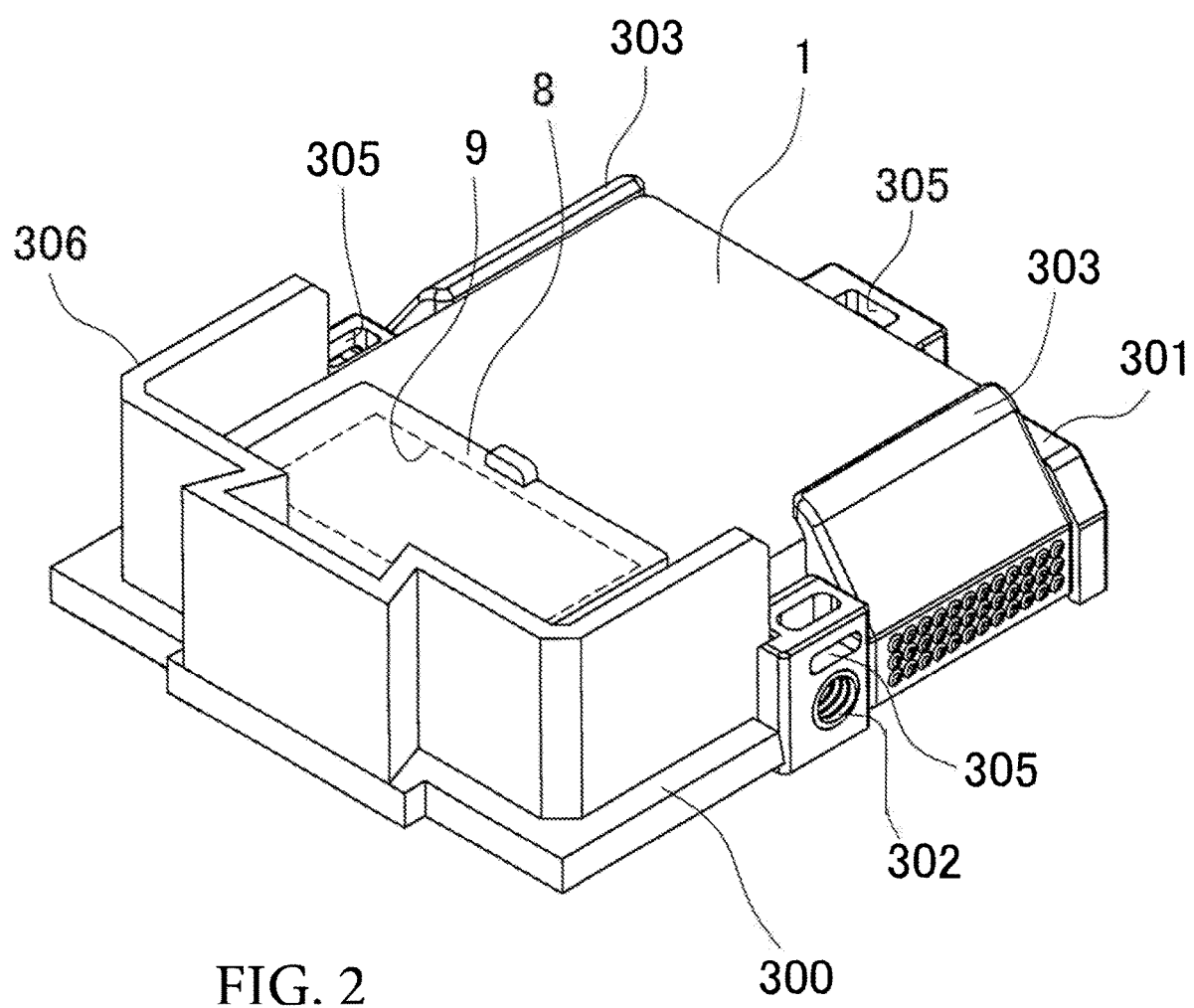
FIG. 2 is a perspective view for illustrating the entire meter reading device (1) according to the first embodiment when viewed from a rear side.
Figure 3:
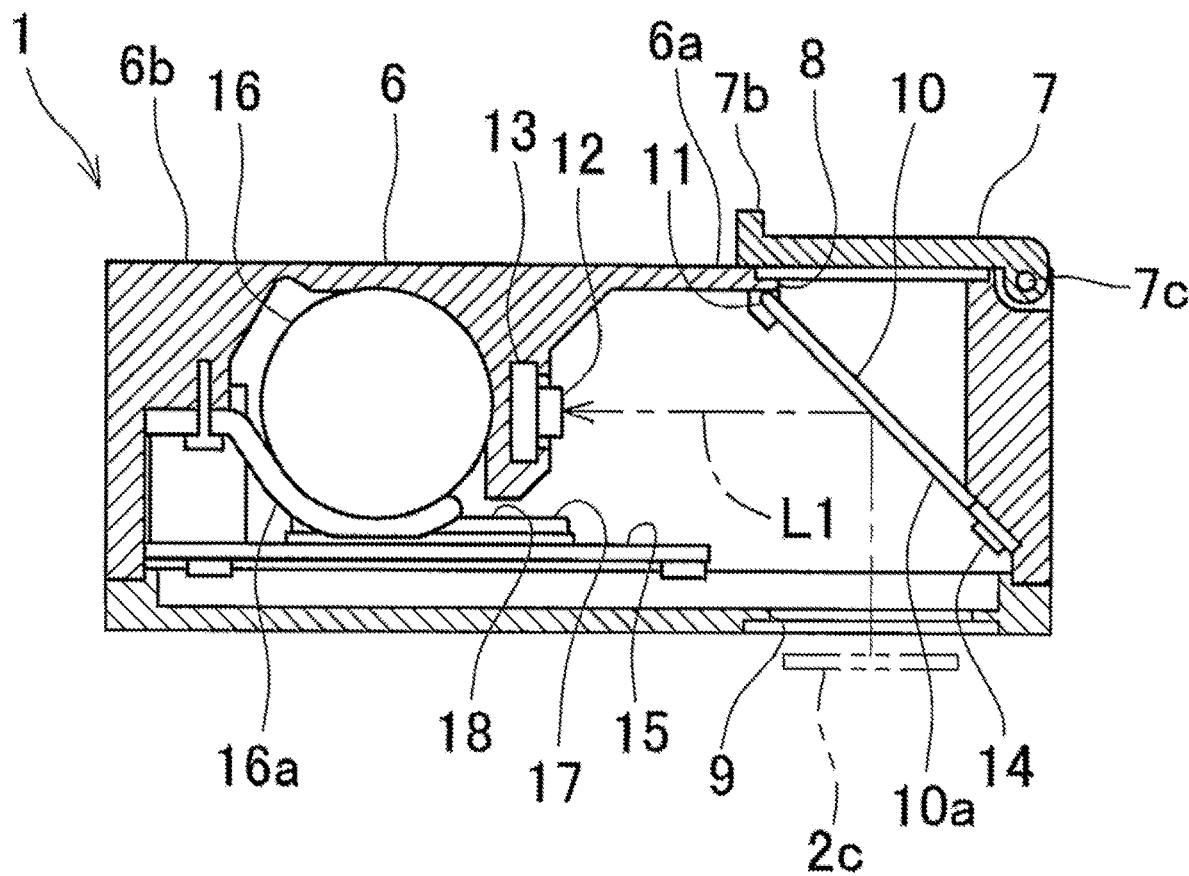
FIG. 3 is a longitudinal sectional view of the meter reading device (1) according to the first embodiment with a lid (7) closed, which is taken along an X axis.
Figure 4:
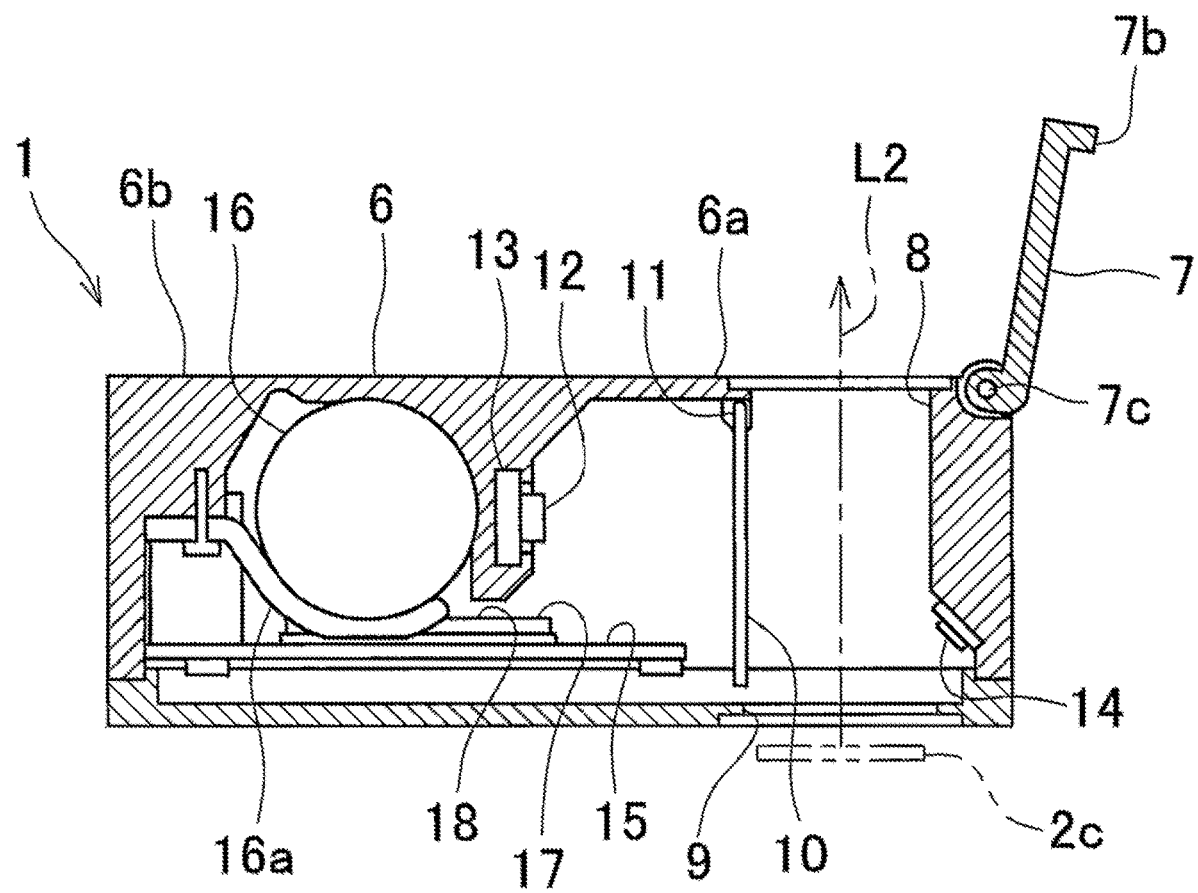
FIG. 4 is a longitudinal sectional view of the meter reading device (1) according to the first embodiment with the lid (7) open, which is taken along the X axis.
Figure 5:
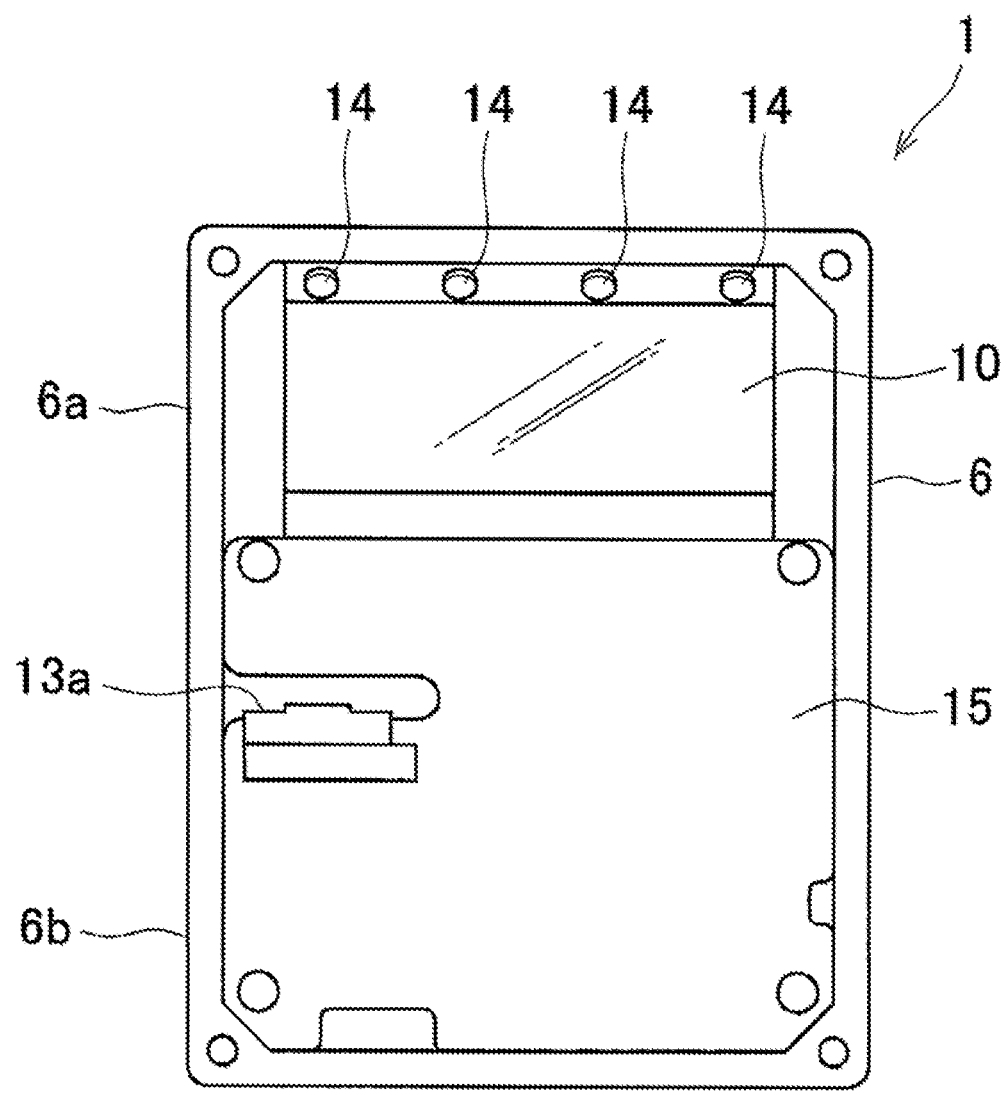
FIG. 5 is a view for illustrating an internal structure of the meter reading device (1) according to the first embodiment from which a rear plate is removed, when viewed from a rear side.
Figure 6:
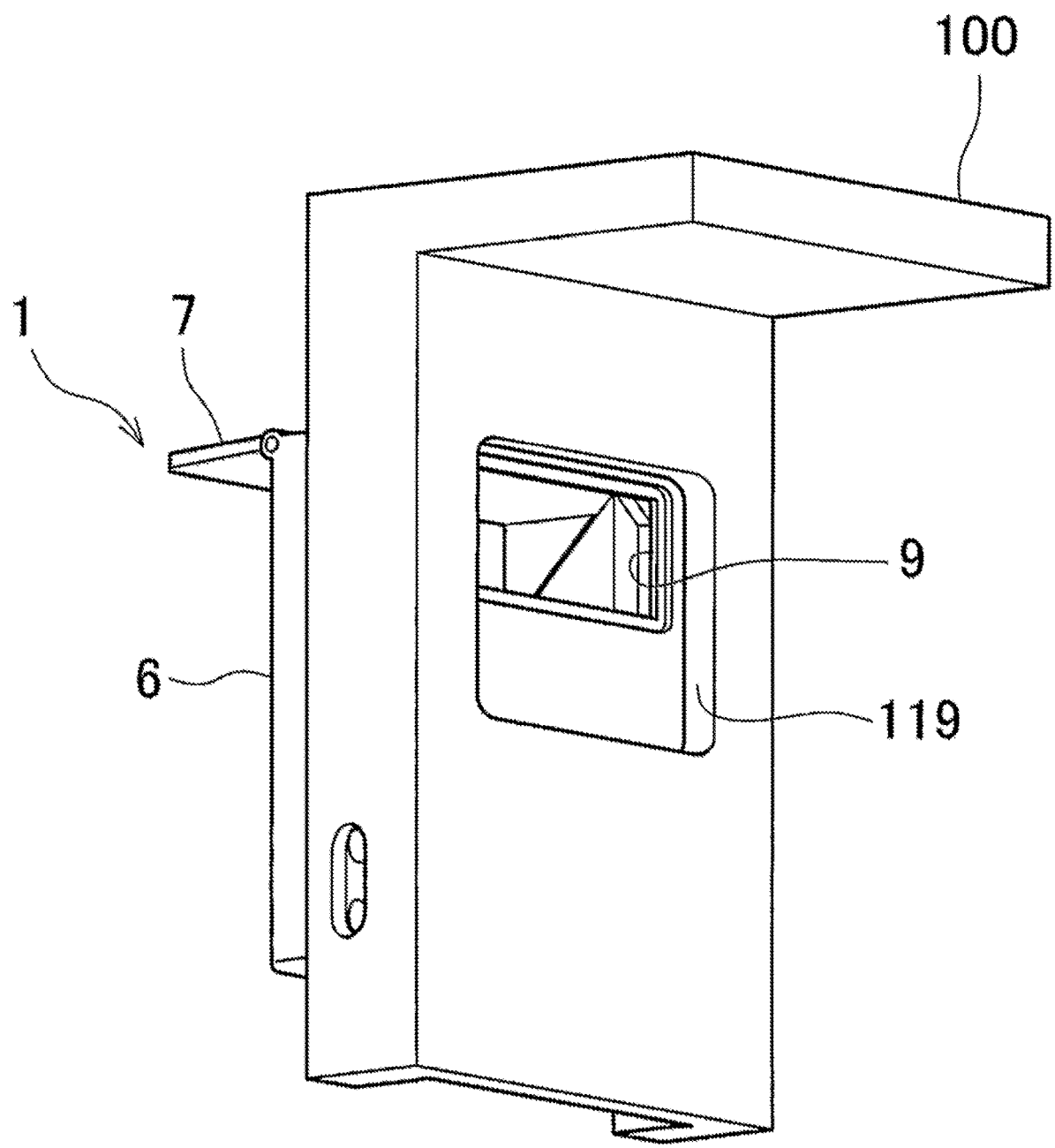
FIG. 6 is a perspective view for illustrating a state in which an attachment member (100) having an L-like shape is mounted to the meter reading device (1) when viewed from a rear side.
Figure 7:
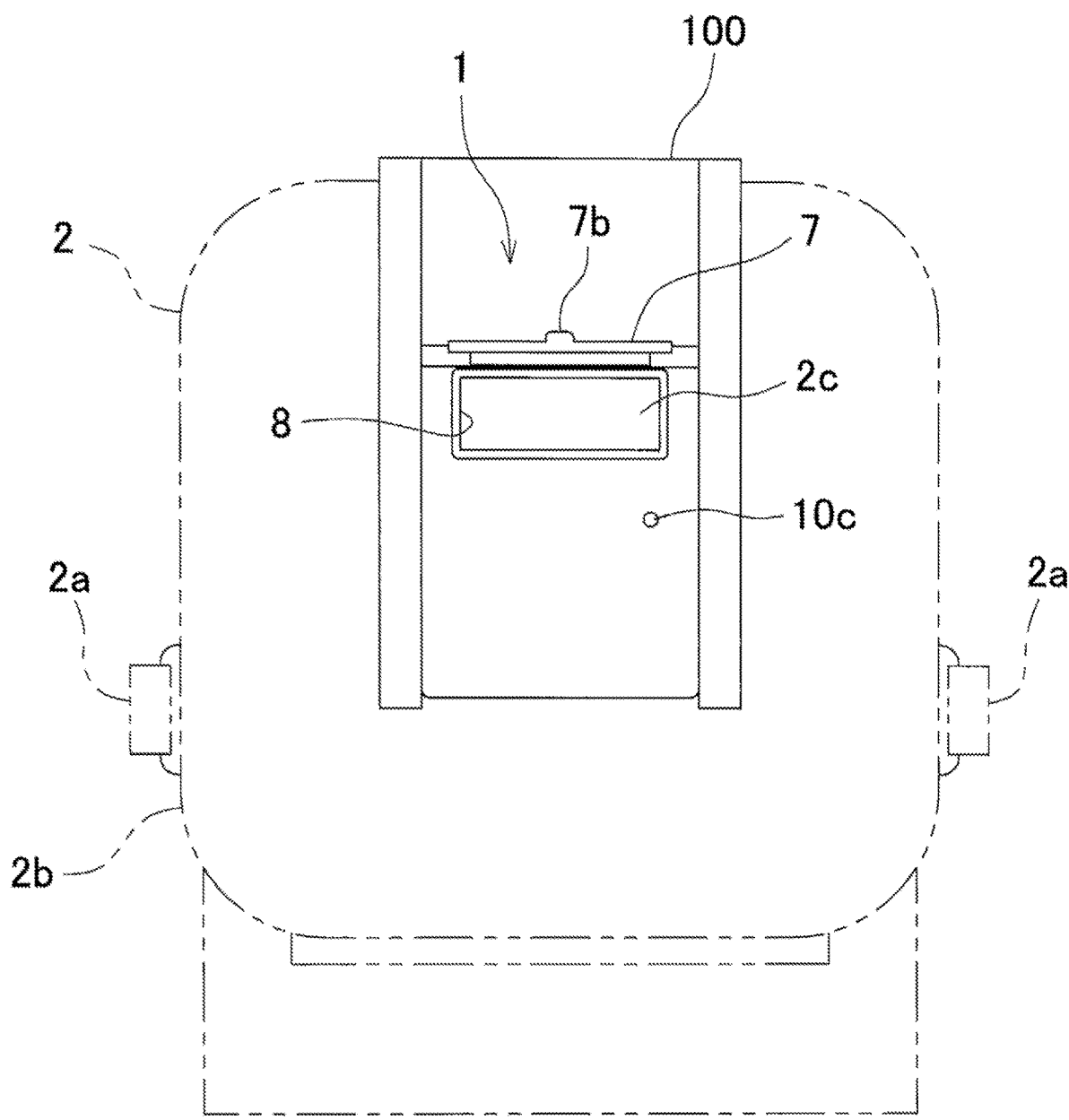
FIG. 7 is a front view for illustrating a state in which the meter reading device (1) held by the attachment member is attached to a meter device (2) with use of the attachment member (100) having an L-like shape.

As illustrated in FIG. 2 to FIG. 4, the casing 6 has an opening 9 that is formed in its rear surface at such a position that the opening 9 is opposed to the check window 8. When the meter reading device 1 is mounted to the meter device 2, the opening 9 is located at such a position as to surround the display surface 2c and allow the measurement value T displayed on the display surface 2c to be visually checked through the check window 8.

The casing 6 includes a distal-end side half 6a having the check window 8 and a base-end side half 6b. As illustrated in FIG. 3 and FIG. 4, a mirror 10 is provided inside the distal-end side half 6a at a location between the check window 8 and the opening 9. The mirror 10 is arranged so that its distal-end side end edge is located on a rear side of the casing 6 and its base-end side end edge is located on a front side of the casing 6. As a result, a reflective surface 10a is oblique to a rear surface of the casing 6. In the first embodiment, the reflective surface 10a is perpendicular to side walls of the casing 6.

The mirror 10 has the base-end side end edge that is pivotably mounted to an inner surface of the casing 6 through intermediation of a pivot shaft 11. When the lid 7 is opened, the mirror 10 can pivot so that the reflective surface 10a becomes perpendicular to the rear surface. After the mirror 10 pivots and the reflective surface 10a is moved from an oblique position to a perpendicular position, the measurement value T displayed on the display surface 2c of the meter device 2 can be visually checked through the check window 8. This pivoting operation may be performed in conjunction with opening and closing of the lid 7. Alternatively, as illustrated in FIG. 1, a switch 10c for a pivoting operation may be additionally provided to the casing 6. In this case, the pivoting operation is performed by pressing the switch 10c.

As illustrated in FIG. 3, a camera 13 is installed inside the base-end side half 6b of the casing 6 with a lens 12 facing the reflective surface of the mirror 10. Further, an illumination device 14 capable of emitting light toward the display surface 2c is provided in the vicinity of the opening 9.

The camera 13 receives light L1 from the display surface 2c, which has passed through the opening 9 and has been reflected by the mirror 10, to thereby pick up image data P of the display surface 2c illuminated by the illumination device 14. The image data P, which has been picked up, is transmitted to a recognition unit 17 provided on a board 15. The recognition unit 17 recognizes the measurement value T from the image data P, and generates numerical data D indicating the measurement value T. The camera 13, the illumination device 14, and the board 15 are connected to a battery 16, and thus a power source for the above-mentioned components is ensured.

The mirror 10 is fixed at an oblique position illustrated in FIG. 3. It is also preferred that the mirror 10 be formed of a semi-reflective mirror. When the mirror 10 is formed of a semi-reflective mirror and the lid 7 is opened under a state in which the mirror 10 is fixed at the oblique position, the measurement value T can be visually checked through the check window 8. At the same time, the camera 13 can pick up the image data P. This effect is similarly obtained in a second embodiment.

Figure 10:
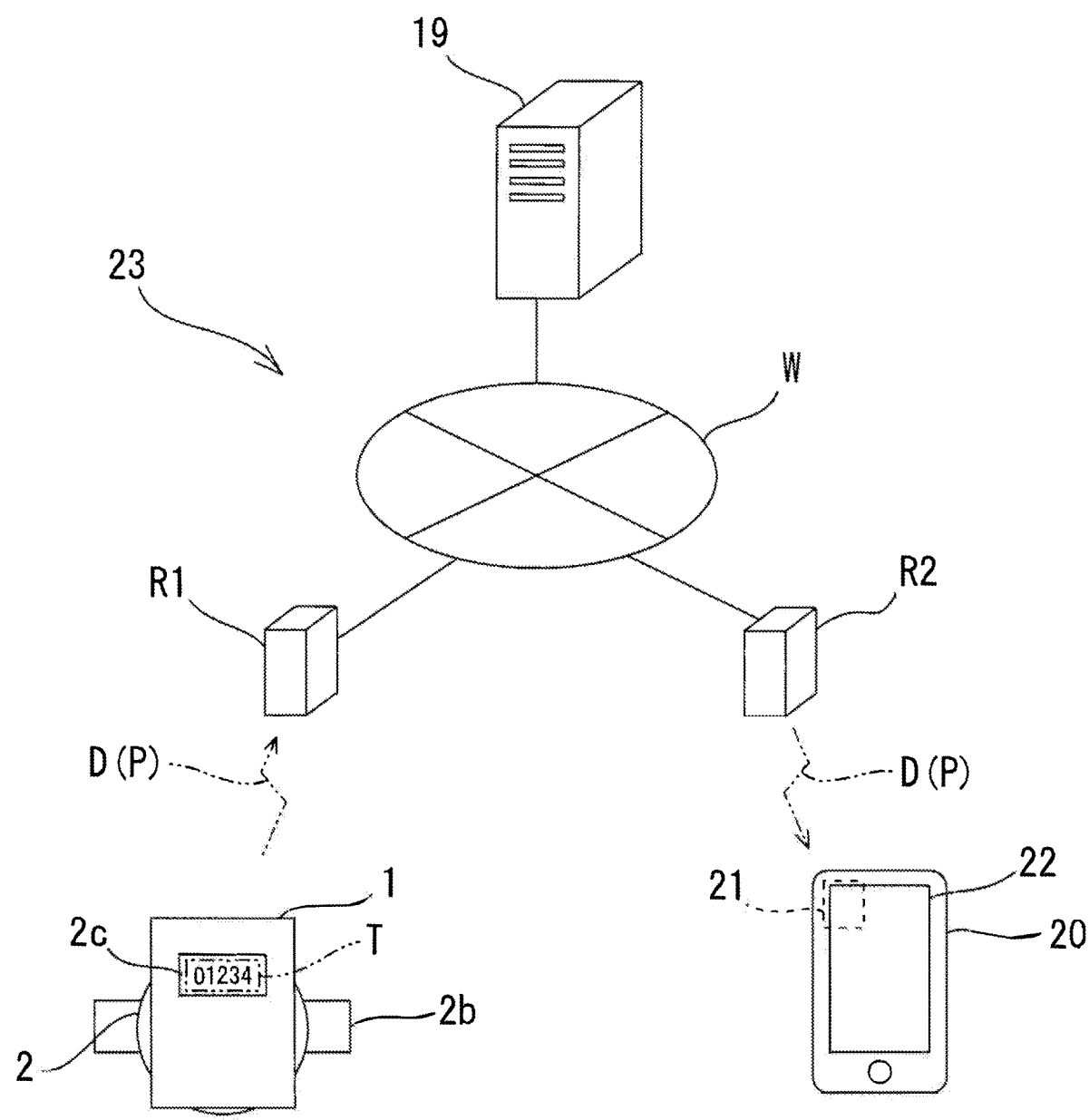
FIG. 10 is a view for illustrating an outline of a remote meter reading system (23).

The recognition unit 17 transmits the numerical data D from a transmission unit 18 provided on the board 15 to a wireless router R1 based on LPWA standards, and then the numerical data D is transmitted via a network W to a storage device 19 provided in a cloud, as illustrated in FIG. 10. The storage device 19, which has received the numerical data D, stores the received numerical data D. It is also preferred that, for example, the numerical data D stored in the storage device 19 be associated with date and time stored in the storage device 19 to form a database DB. Further, in some cases, the image data P is transmitted from the transmission unit 18 based on the LPWA standards as in the case of the transmission of the numerical data D.

Further, a terminal device 20 includes a data acquisition means 21. The data acquisition means 21 is connected to the storage device 19 via a wireless router R2 connected to the network W so as to be able to acquire the numerical data D stored in the storage device 19. Further, as illustrated in FIG. 10, the terminal device 20 includes a display 22 functioning as an output unit capable of outputting and displaying the numerical data D acquired by the data acquisition means 21. In this embodiment, a system including the meter reading device 1, the storage device 19, and the terminal device 20 is defined as a remote meter reading system 23.

Figure 11:
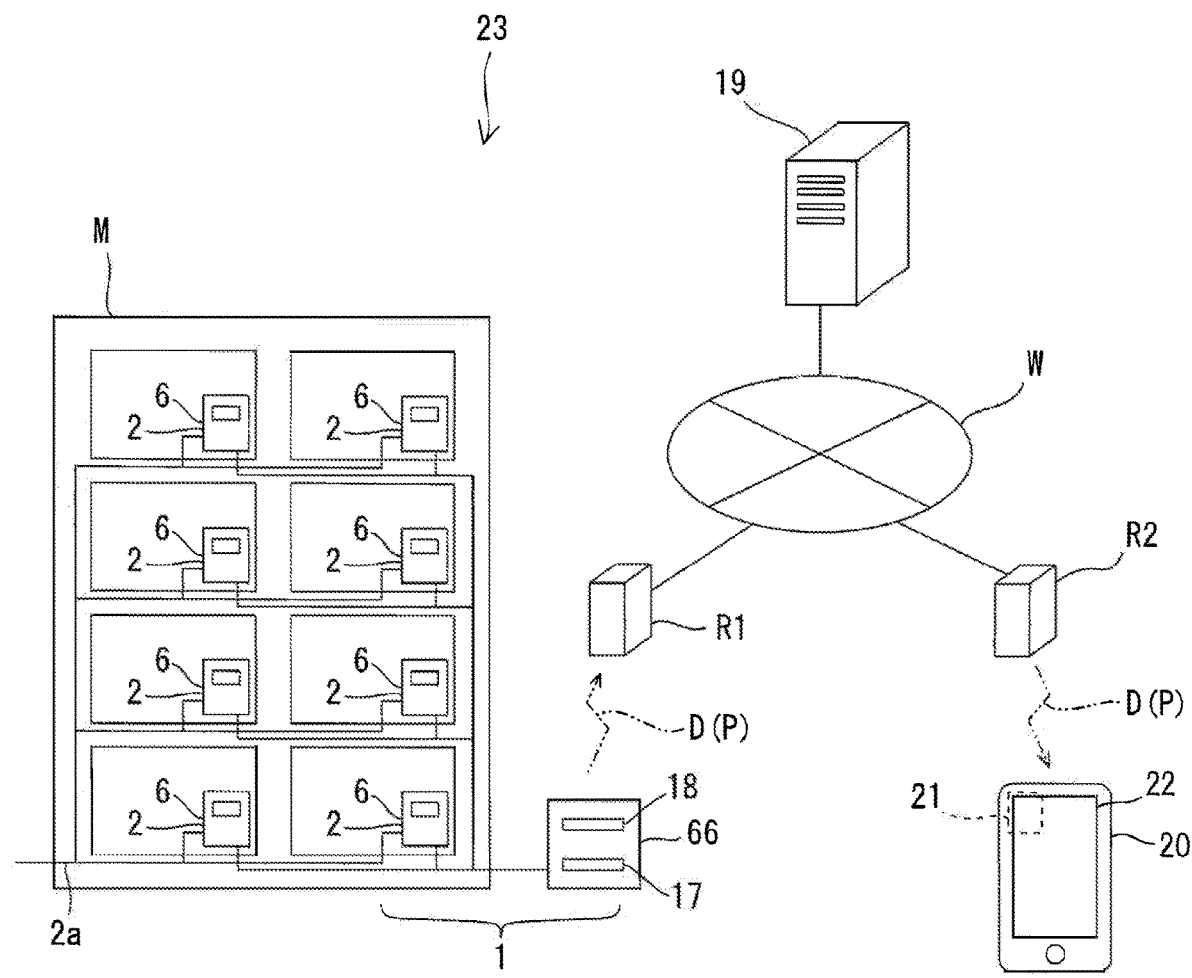
Figure 12:
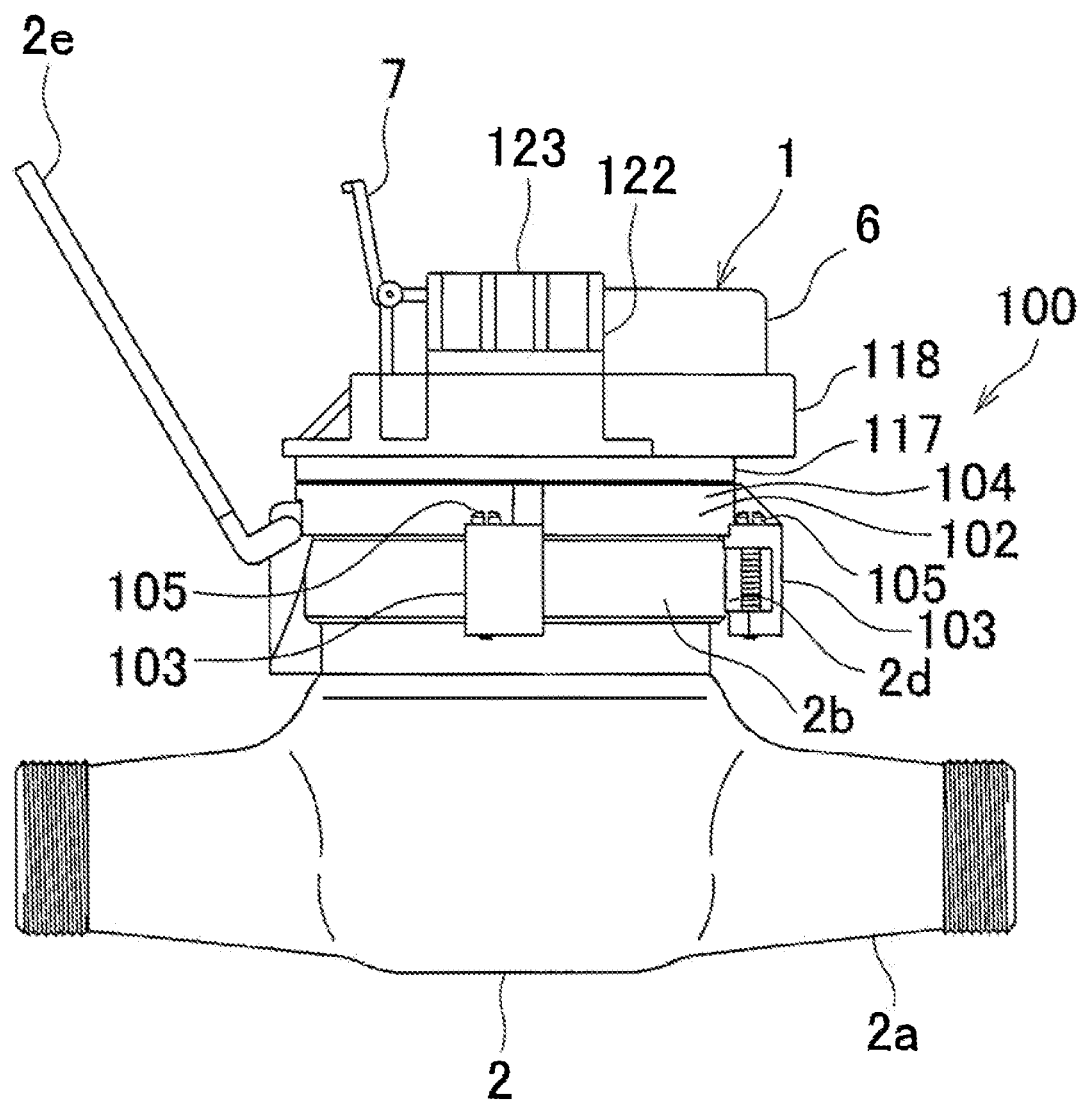
FIG. 12 is a left side view for illustrating a state in which the attachment member (100) that is holding the meter reading device (1) is attached to the meter device (2).
Figure 13:
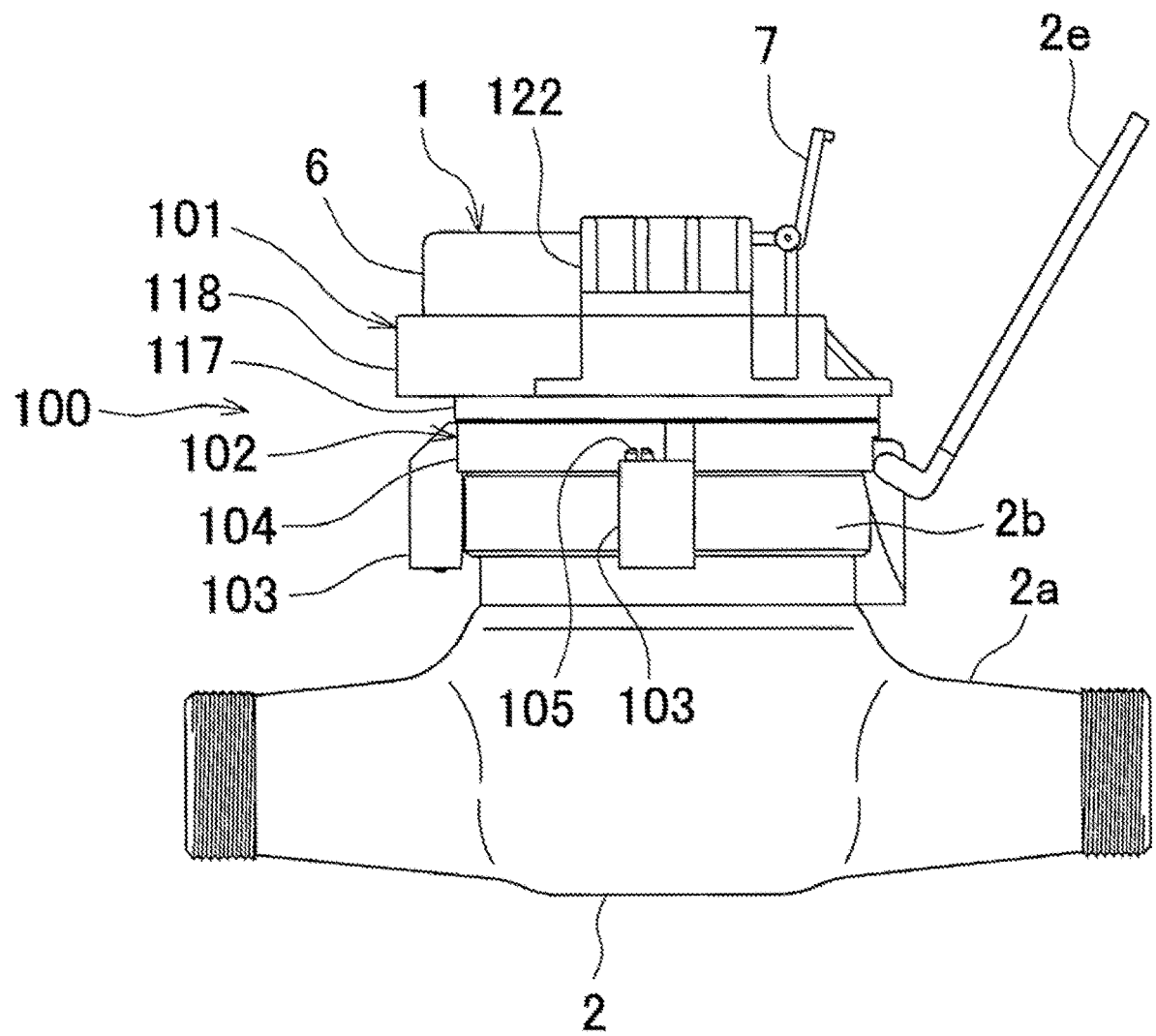
FIG. 13 is a right side view for illustrating a state in which the attachment member (100) that is holding the meter reading device (1) is attached to the meter device (2).
Figure 14:
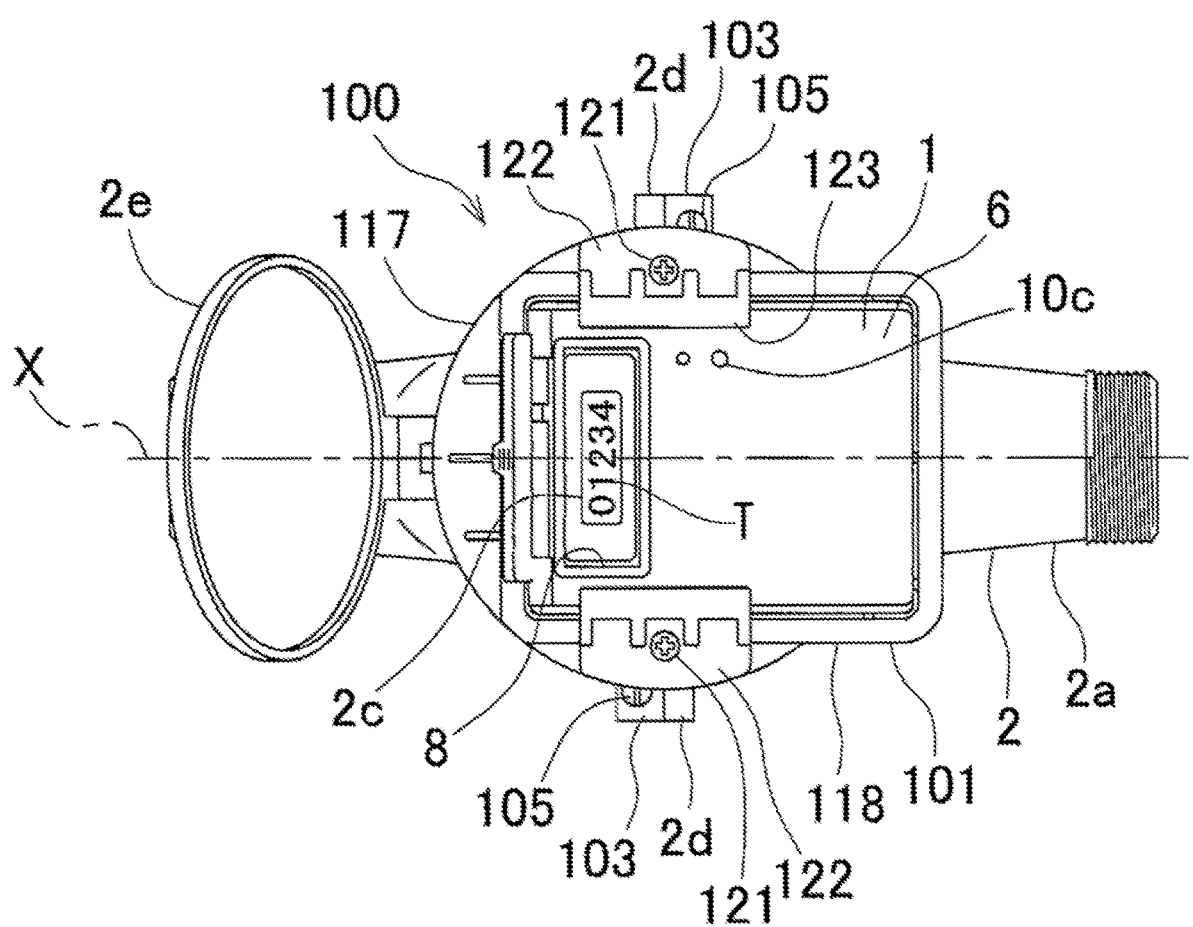
FIG. 14 is a front view for illustrating a state in which the attachment member (100) that is holding the meter reading device (1) is attached to the meter device (2).
Figure 15:
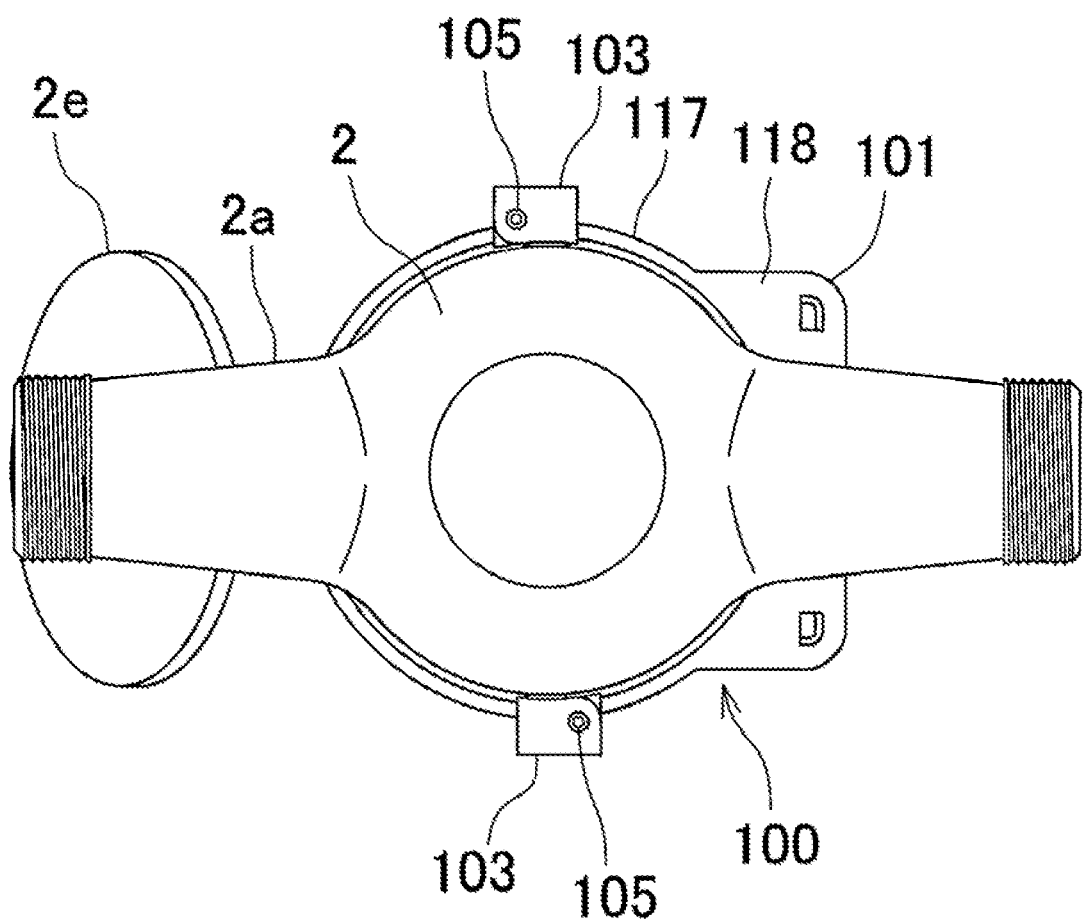
FIG. 15 is a rear view for illustrating a state in which the attachment member (100) that is holding the meter reading device (1) is attached to the meter device (2).
Figure 16:
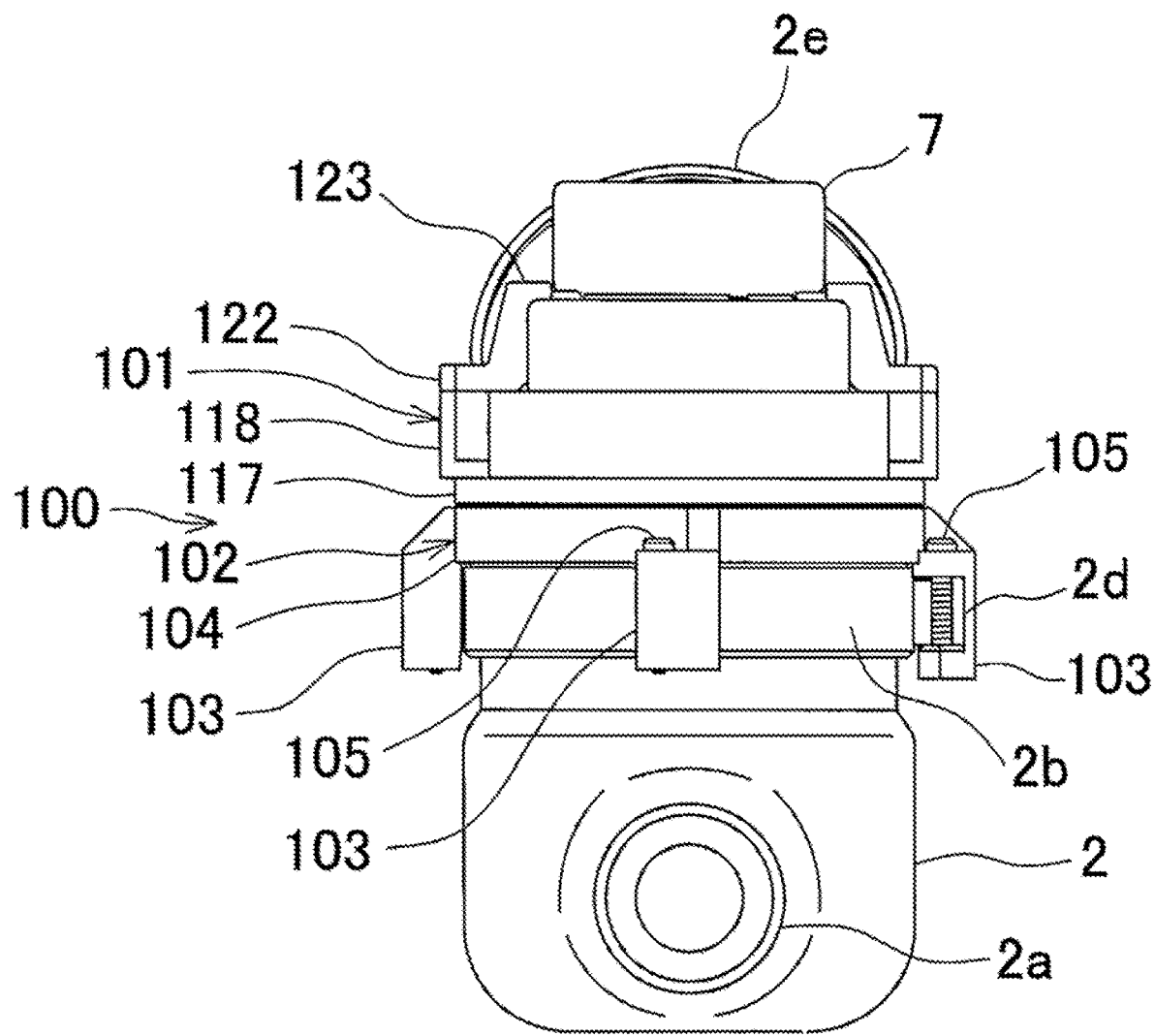
FIG. 16 is a bottom view for illustrating a state in which the attachment member (100) that is holding the meter reading device (1) is attached to the meter device (2).
Figure 17:
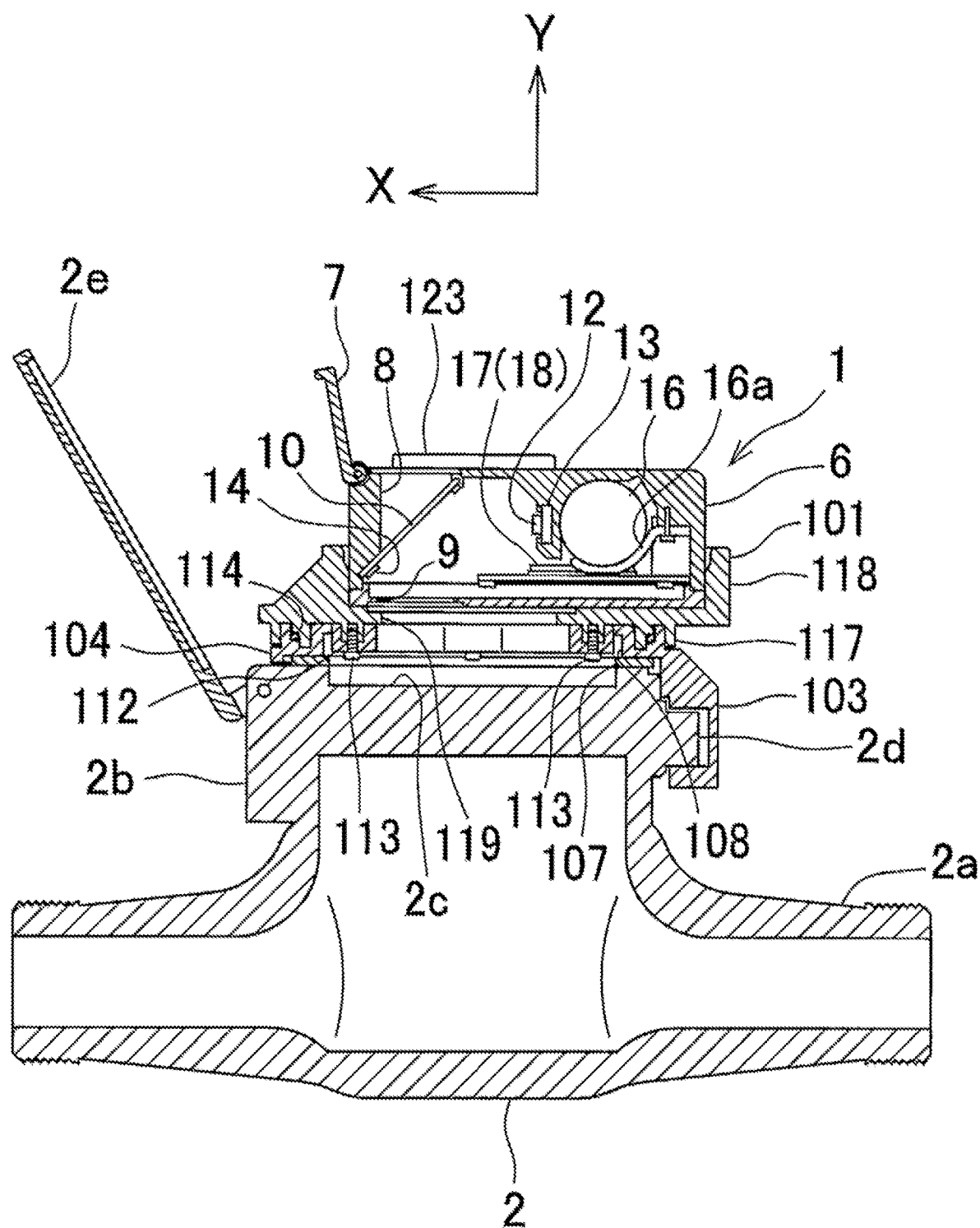
FIG. 17 is a longitudinal sectional view of a state in which the attachment member (100) that is holding the meter reading device (1) is attached to the meter device (2), which is taken along the X axis.
Figure 18:
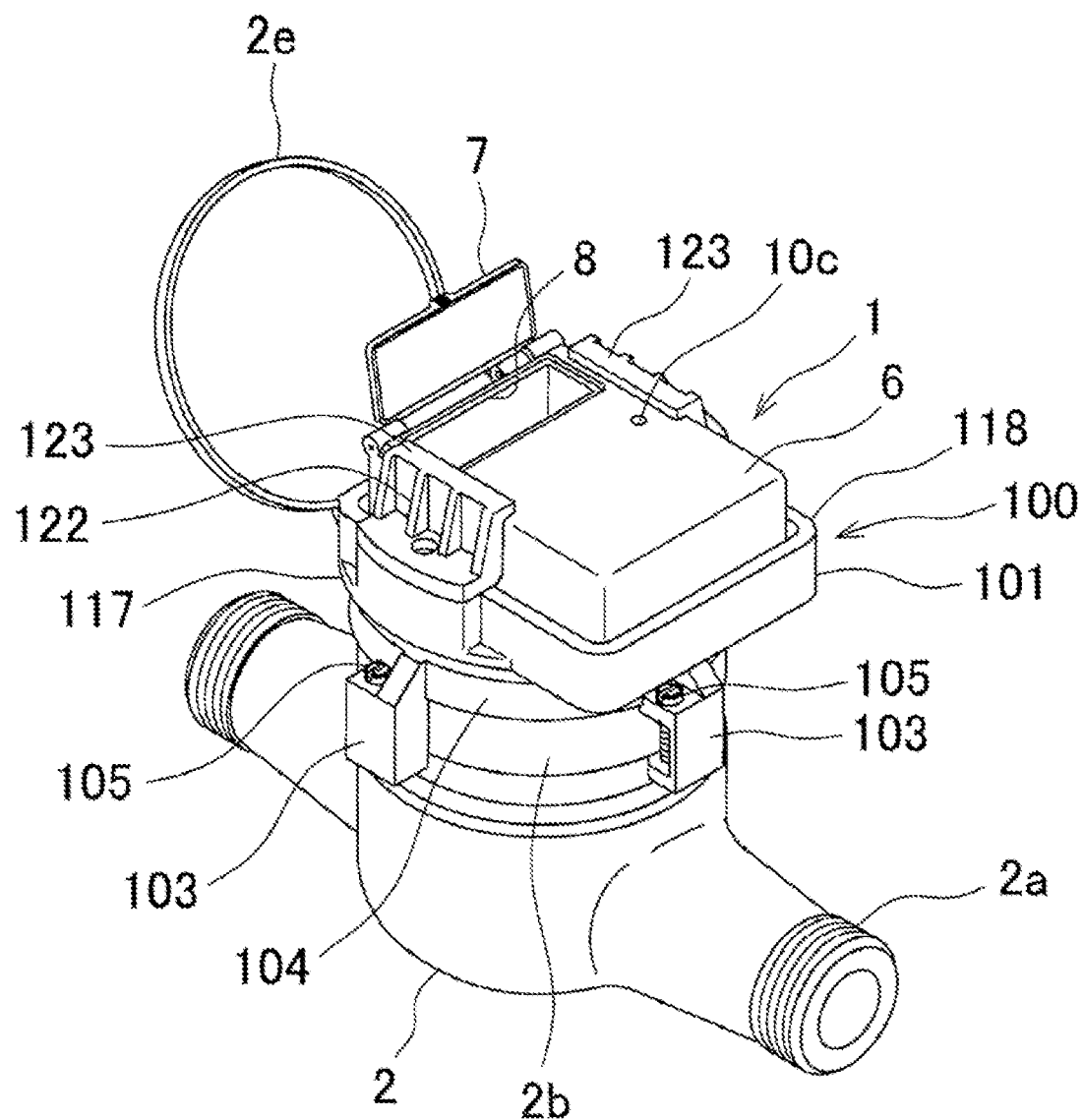
FIG. 18 is a perspective view of a state in which the attachment member (100) that is holding the meter reading device (1) is attached to the meter device (2) when viewed from a front side.

Further, as illustrated in FIG. 11, the remote meter reading system 23 can also transmit the numerical data D from the meter device 2 installed at each residence in an apartment unit M via the meter reading device 1 to the storage device 19. In this case, it is also preferred that the meter reading device 1 additionally include a sub-casing 66 separate from the casing so that the numerical data D is transmitted from the recognition unit 17 and the transmission unit 18 that are accommodated in the sub-casing 66.

Still further, the remote meter reading system 23 improves a character recognition rate for the numerical data D through the AI to increase accuracy of acquired data. More specifically, it is preferred that the recognition unit 17 include a character analysis unit, a conversion unit, and a numerical-data generating unit. The character analysis unit performs image analysis on the image of the measurement value T displayed on the display surface 2c to extract a character-shape feature representing a measurement value included in an image pickup range. After the numerical data, which is associated with a kind of the character-shape feature, is input to the learned recognition unit 17, the conversion unit derives a specific character from the character-shape feature and converts the specific character into character data. The numerical-data generating unit generates numerical data based on the character data D used as a character string corresponding to the measurement value.

Second Embodiment

Figure 8:
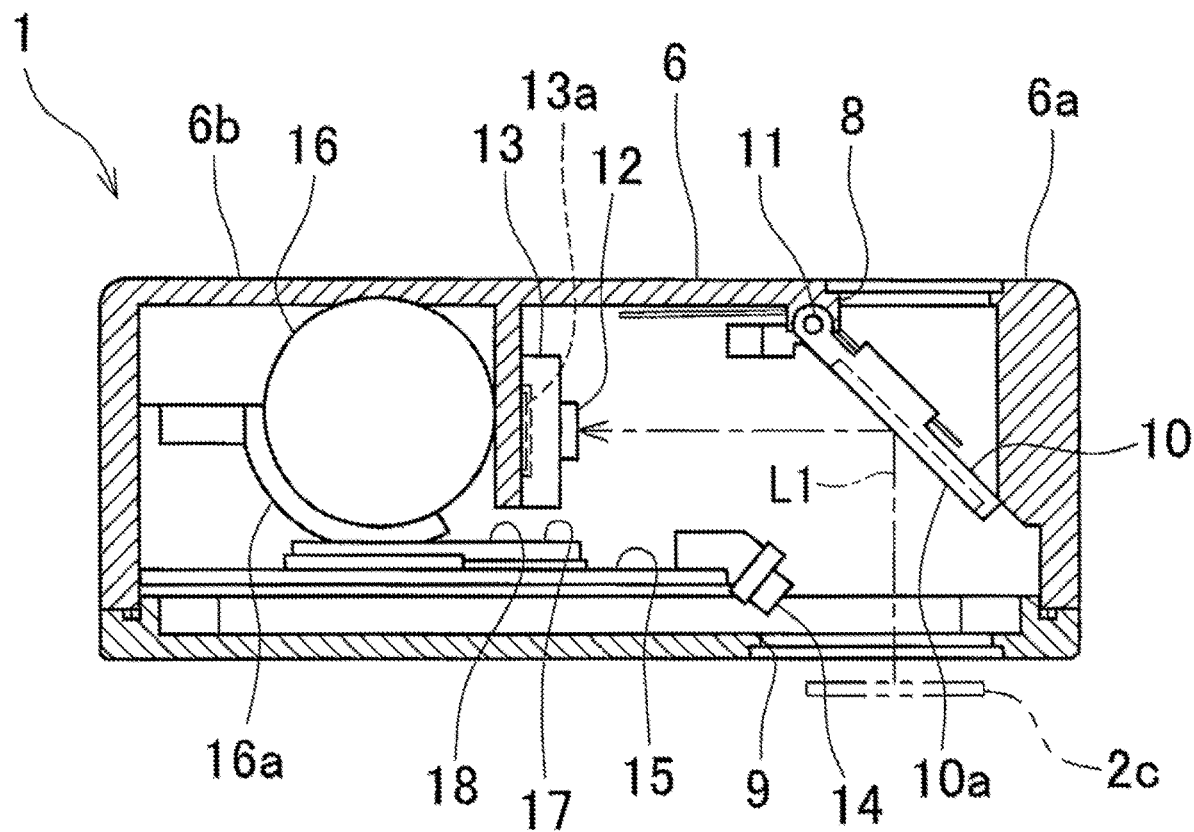
FIG. 8 is a longitudinal sectional view of a meter reading device (1) according to a second embodiment, which is taken along an X axis.

FIG. 8 is a longitudinal sectional view of a meter reading device 1 according to a second embodiment. In the second embodiment, similarly to the first embodiment, the meter reading device 1 includes a casing 6, a lid 7, a check window 8, an opening 9, a mirror 10, a pivot shaft 11, a lens 12, a camera 13, a board 15, and a battery 16.

The casing 6 includes a distal-end side half 6a having the check window 8 and a base-end side half 6b. As illustrated in FIG. 8, the mirror 10 is provided inside the distal-end side half 6a at a location between the check window 8 and the opening 9. The mirror 10 is arranged so that its distal-end side end edge is located on a rear side of the casing 6 and its base-end side end edge is located on a front side of the casing 6. As a result, a reflective surface 10a is oblique to a rear surface of the casing 6. In the second embodiment, the reflective surface 10a is perpendicular to side walls of the casing 6.

The mirror 10 has the base-end side end edge that is pivotably mounted to an inner surface of the casing 6 through intermediation of the pivot shaft 11. When the lid 7 is opened, the mirror 10 can pivot so that the reflective surface 10a becomes perpendicular to the rear surface. After the mirror 10 pivots and the reflective surface 10a is moved from an oblique position to a perpendicular position, the measurement value T displayed on the display surface 2c of the meter device 2 can be visually checked through the check window 8. This pivoting operation may be performed in conjunction with opening and closing of the lid 7. Alternatively, for example, a switch for a pivoting operation may be additionally provided to the casing 6. In this case, the pivoting operation is performed manually.

The camera 13 is installed inside the base-end side half 6b of the casing 6 with the lens 12 facing the reflective surface of the mirror 10.

Meanwhile, an illumination device 14 in the second embodiment is mounted along a base-end side of the opening 9 on an inner side of the board 15, and can emit light from the base-end side of the opening 9 to the display surface 2c. In this manner, electric power can easily be supplied through the board 15 to the illumination device 14.

Third Embodiment

Figure 9:
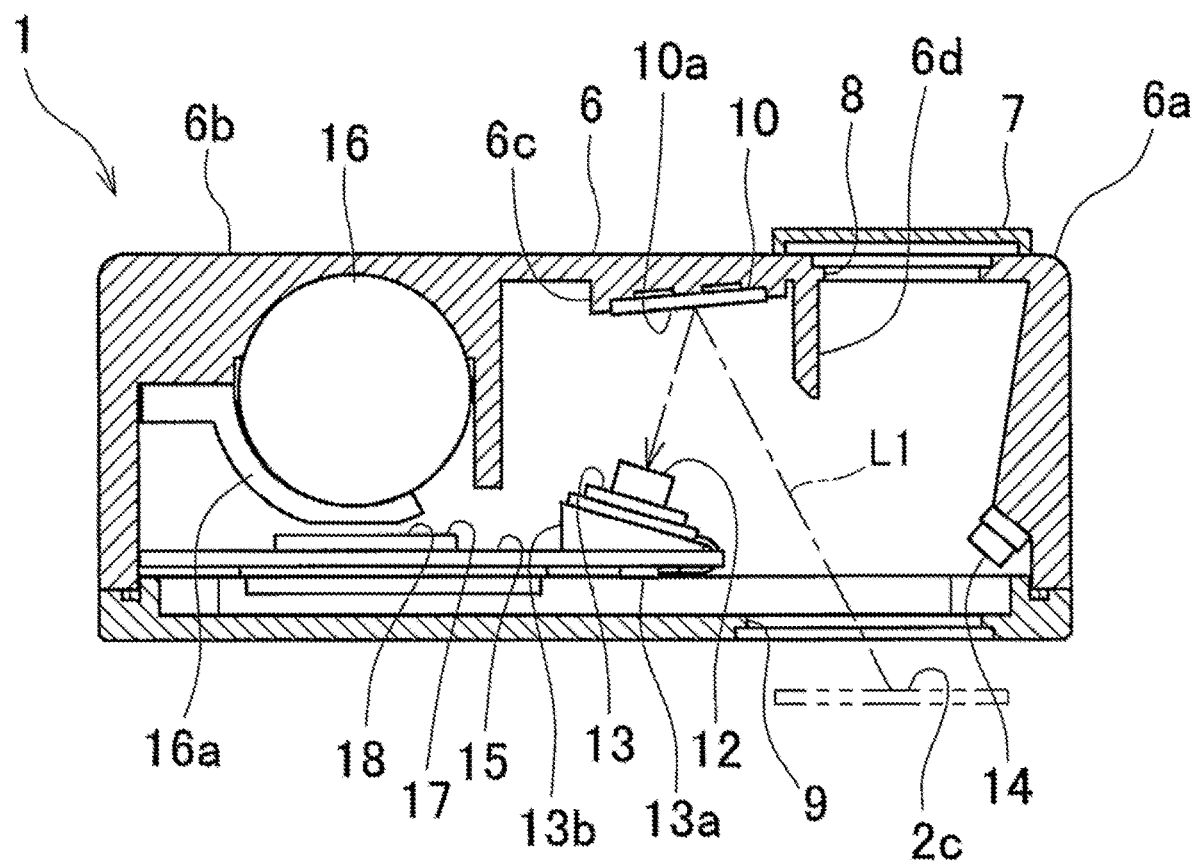
FIG. 9 is a longitudinal sectional view of a meter reading device (1) according to a third embodiment, which is taken along an X axis.

FIG. 9 is a longitudinal sectional view of a meter reading device 1 according to a third embodiment. In the third embodiment, similarly to the first embodiment, the meter reading device 1 includes a casing 6, a lid 7, a check window 8, an opening 9, a lens 12, a camera 13, an illumination device 14, a board 15, and a battery 16.

The casing 6 includes a distal-end side half 6a having the check window 8 and a base-end side half 6b. As illustrated in FIG. 9, a mirror 10 is provided inside the distal-end side half 6a at a location between the check window 8 and the opening 9.

Meanwhile, a fixed mirror 24 is mounted onto an inclined base 6c slightly inclined toward a distal end from a perpendicular direction with respect to a rear surface of the casing 6. The inclined base 6c is formed on an inner surface of the casing 6 so as to be located on a base-end side of the check window 8. The camera 13 is installed on the inner surface of the casing 6 so as to be located on the base-end side of the opening 9. The lens 12 is mounted so as to be slightly inclined toward the distal end from the perpendicular direction with respect to a front surface of the casing 6.

Image data P of a display surface 2c, which has passed through the opening 9 and has been reflected by the fixed mirror 24, is incident substantially perpendicularly on the lens 12, and is picked up by the camera 13.

In this case, the illumination device 14 is only required to be installed in the vicinity of the inner surface of the opening 9. As an example in the third embodiment, as illustrated in FIG. 4, similarly to the first embodiment, the illumination device 14 is provided to a distal end side of an inside of the opening 9 so as to be able to radiate light toward the display surface 2c.

[Attachment Member 100]

FIG. 12 to FIG. 19 are six views and perspective views of an external appearance of the attachment member 100. The attachment member 100 enables attachment of the meter reading device 1 to the meter device 2. The attachment member 100 includes a holding frame 101 that holds the meter reading device 1. Further, the attachment member 100 includes a fixing member 102. The fixing member 102 is connected to the holding frame 101, and has gripping portions 103 that are removably fixable to the meter device 2.

Further, with reference to FIG. 12 to FIG. 19, a specific example of a structure of the attachment member 100 is described. The fixing member 102 includes a fixing portion main body 104 and the gripping portions 103. The fixing portion main body 104 has a hollow annular shape. The gripping portions 103 project from an outer peripheral surface of the fixing portion main body 104, and can grip protruding portions 2d on an outer peripheral wall of the meter device 2. Each of the gripping portions 103 has a screw hole 106. When fixing screws 105 are inserted through the screw holes 106, the attachment member 100 can be fixed to the meter device 2. When the attachment member 100 is fixed to the meter device 2, a washer 107 is provided between a bottom surface of the fixing member 102 and a front surface of the meter device 2. The washer 107 closes a gap between the fixing member 102 and the meter device 2 to thereby prevent water intrusion from an outside.

Figure 19:
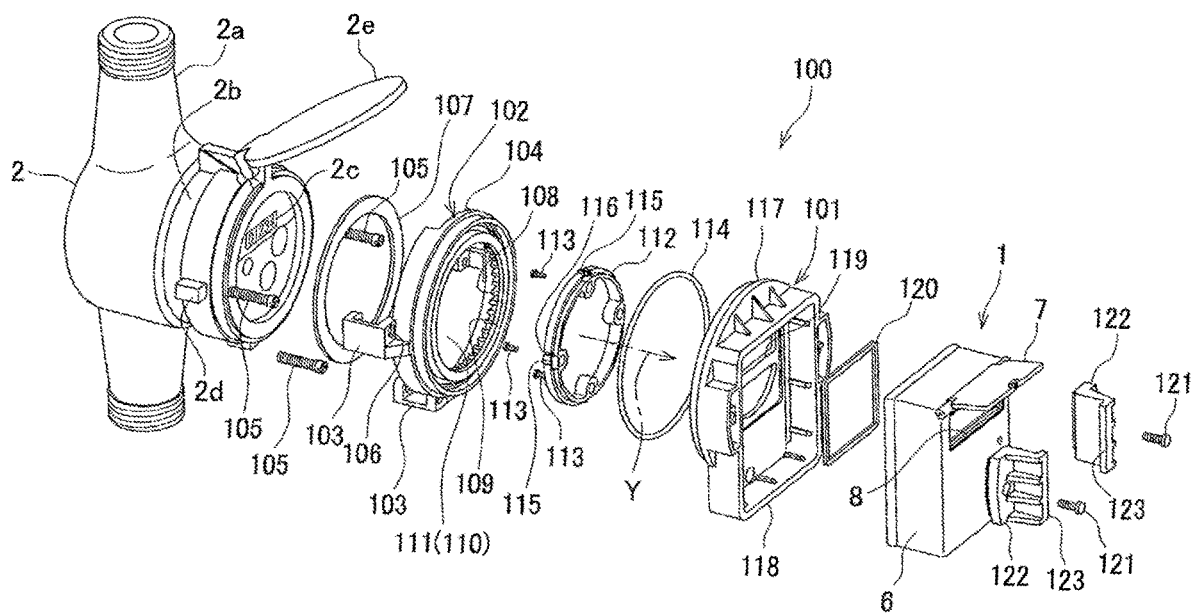
FIG. 19 is an exploded view of the attachment member (100) together with the meter reading device (1) and the meter device (2).

As illustrated in FIG. 19, the fixing portion main body 104 has a gear-like uneven structure 108 formed on its inner peripheral surface. The fixing portion main body 104 has a flange portion 109 on a flat surface side of the gear-like uneven structure 108. The flange portion 109 has a diameter smaller than an outer diameter of the gear-like uneven structure 108. Meanwhile, a bottom end surface 110 of the fixing portion main body 104 has a hollow portion 111. The hollow portion 111 has an inner peripheral surface equal to or larger than an outer diameter of the gear-like uneven structure 108.

The holding frame 101 can be connected to a front side of the fixing member 102. The fixing member 102 and the holding frame 101 are connected by fixing an annular rotatable ring 112 to the holding frame 101 with use of screws 113. The annular rotatable ring 112 is inserted from the hollow portion 111 of the fixing portion main body 104 to be fitted into the gear-like uneven structure 108. The annular rotatable ring 112 fitted into the gear-like uneven structure 108 is turnable about an axis Y perpendicular to the bottom end surface 110 as a rotation axis. An 0 ring 114 is fitted so as to be in contact with contact surfaces of the holding frame 101 and the fixing member 102 to thereby prevent water intrusion along the contact surfaces.

The annular rotatable ring 112 has a plurality of small protruding portions 115 on its outer peripheral surface. The small protruding portions 115 are in connection with the outer peripheral surface of the annular rotatable ring 112 through elastic plates 116 interposed therebetween. The annular rotatable ring 112 can be turned while causing the small protruding portions 115 to pass over protruding portions of the gear-like uneven structure 108 owing to elasticity of the elastic plates 116. Then, the small protruding portions 115 are engaged with suitable recessed portions to perform positioning. In this manner, the annular rotatable ring 112 can be fixed.

The holding frame 101 includes a seat portion 117 and a frame portion 118. The annular rotatable ring 112 can be fixed to the seat portion 117 with use of screws. The frame portion 118 is formed on a flat surface side of the seat portion 117, and allows the meter reading device 1 to be fitted thereinto. The frame portion 118 has a bottom surface with an open window 119 that is formed to pass through the seat portion 117. The open window 119 is formed at a position that allows the open window 119 to communicate with the check window 8 and the opening 9 of the meter reading device 1 fitted into the frame portion 118. The open window 119 allows the measurement value displayed on the display surface 2c of the meter device 2, to which the attachment member 100 is mounted, to be visually checked through the check window 8 of the meter reading device 1 fitted into the frame portion 118.

In this embodiment, the bottom surface of the frame portion 118 has a lower-level portion around the open window 119, and the lower-level portion allows a frame-shaped ring 120 to be fitted therein. The fitting of the frame-shaped ring 120 prevents water intrusion into the open window 119 along a peripheral surface of the meter reading device 1 fitted into the frame portion 118.

Further, the meter reading device 1 fitted into the frame portion 118 is pressed toward the bottom surface of the frame portion 118 by fixing claws 122, and is fixed thereto. The fixing claws 122 can be fixed to the holding frame 101 along an outer periphery of the frame portion 118 with use of screws 121. Each of the fixing claws 122 has a claw piece 123. The claw piece 123 extends radially inward over a flat surface end of the frame portion 118 in a state of being fixed to the seat portion 117 with a screw. The claw pieces 123 are brought into pressure contact with a flat surface of the meter reading device 1 to fix the meter reading device 1.

The attachment member 100 allows the holding frame 101 to turn with respect to the fixing member 102 under a state in which the attachment member 100 is attached to the meter device 2 and the meter reading device 1 is fixed to the attachment member 100. As a result, even when the attachment member 100 is attached to the meter device 2 and the measurement value displayed on the display surface 2c is shifted in angular position about the axis Y perpendicular to a plane of the opening 9 of the meter reading device 1 as a rotation axis, the angular position can easily be adjusted while the display surface 2c is being viewed through the check window 8 and the opening 9. Even when, in particular, positions of the protruding portions 2d on the outer peripheral wall of the meter device 2 differ for each meter device 2, the angular position can be adjusted in accordance with specifications of each of the meter devices 2. Thus, the meter reading device 1 can be attached to the meter device 2 at a proper angular position.

A failure probability in reading when the meter reading device 1 picks up an image of the measurement value and reads the measurement value can be reduced by adjusting the angular position.

[Attachment Member 200]

Figure 20:
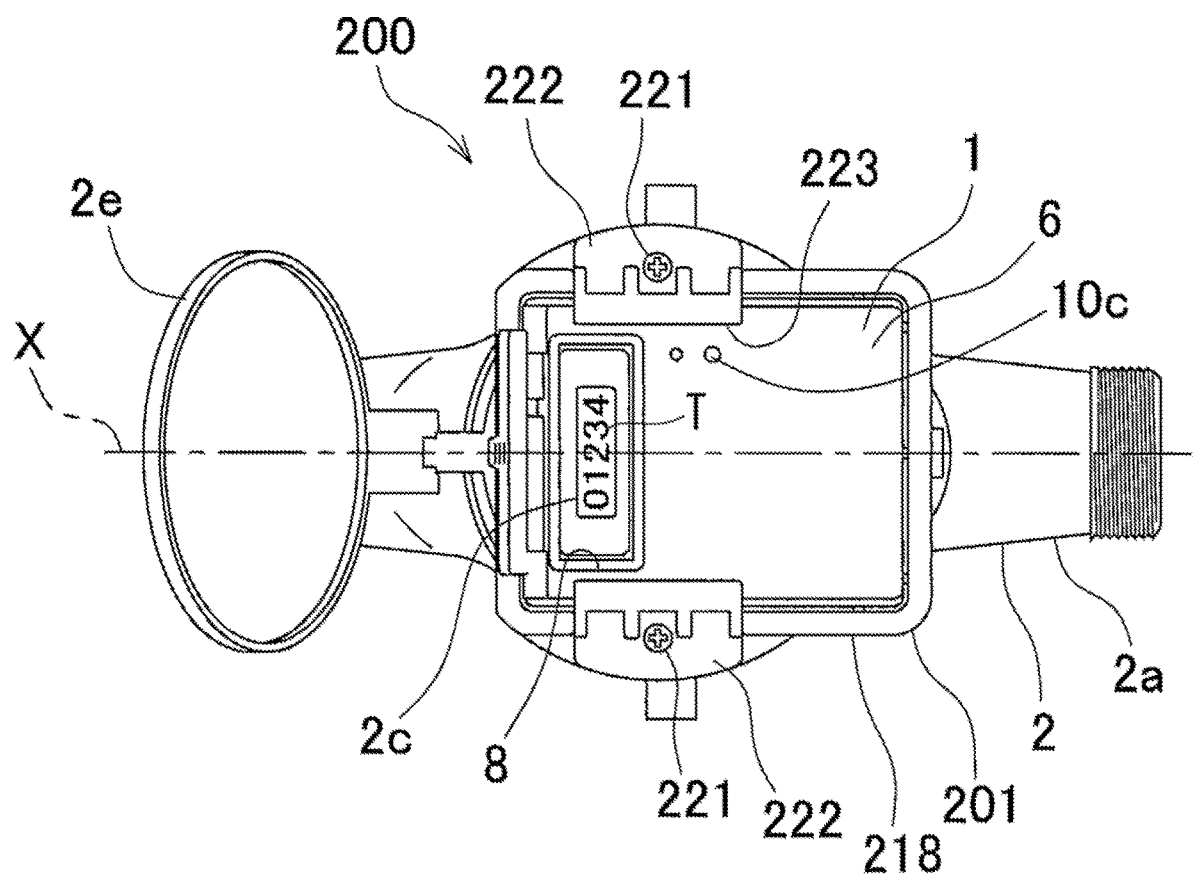
FIG. 20 is a front view for illustrating a state in which an attachment member (200) that is holding the meter reading device (1) is attached to the meter device (2).
Figure 21:
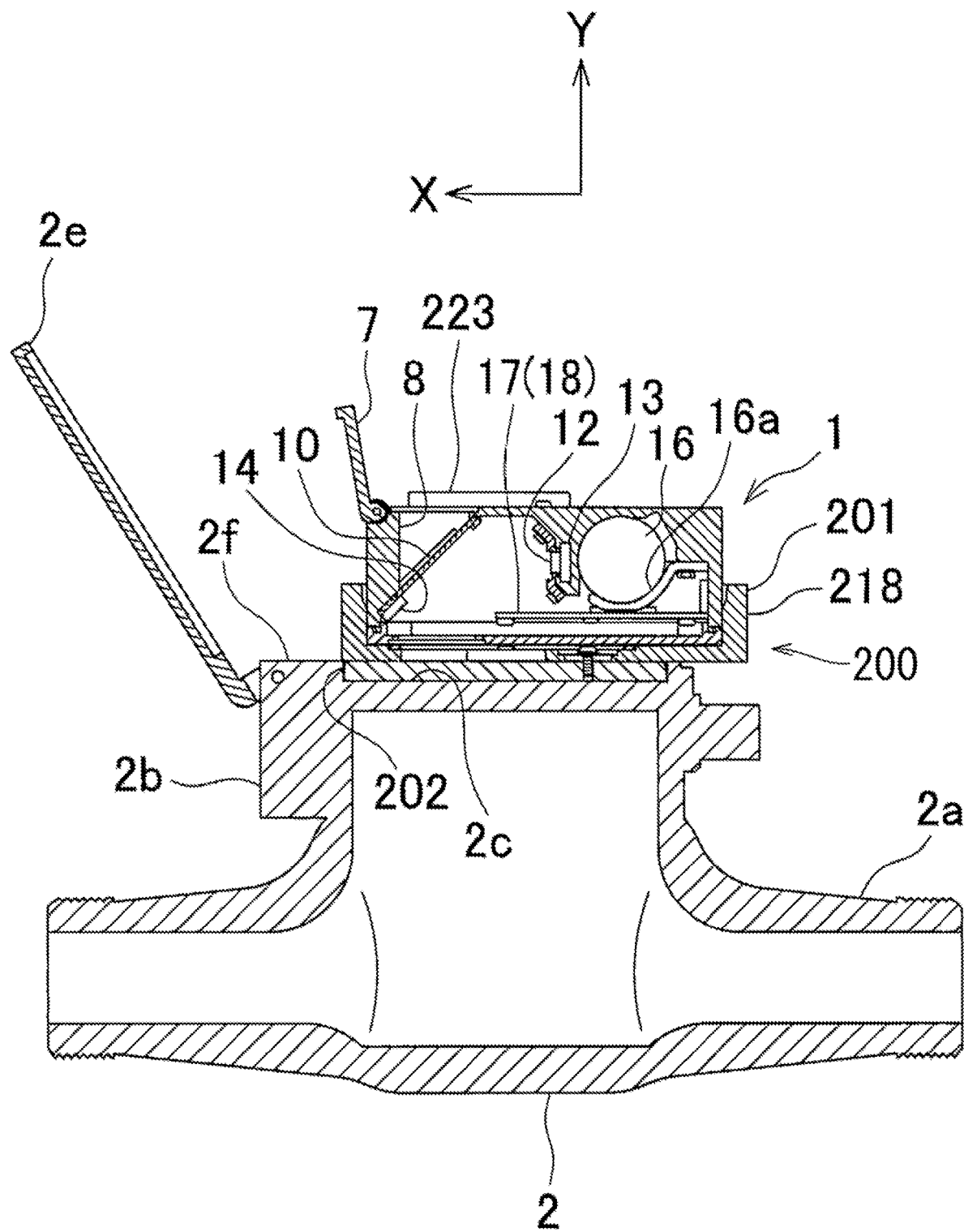
FIG. 21 is a longitudinal sectional view of a state in which the attachment member (200) that is holding the meter reading device (1) is attached to the meter device (2), which is taken along the X axis.
Figure 22:
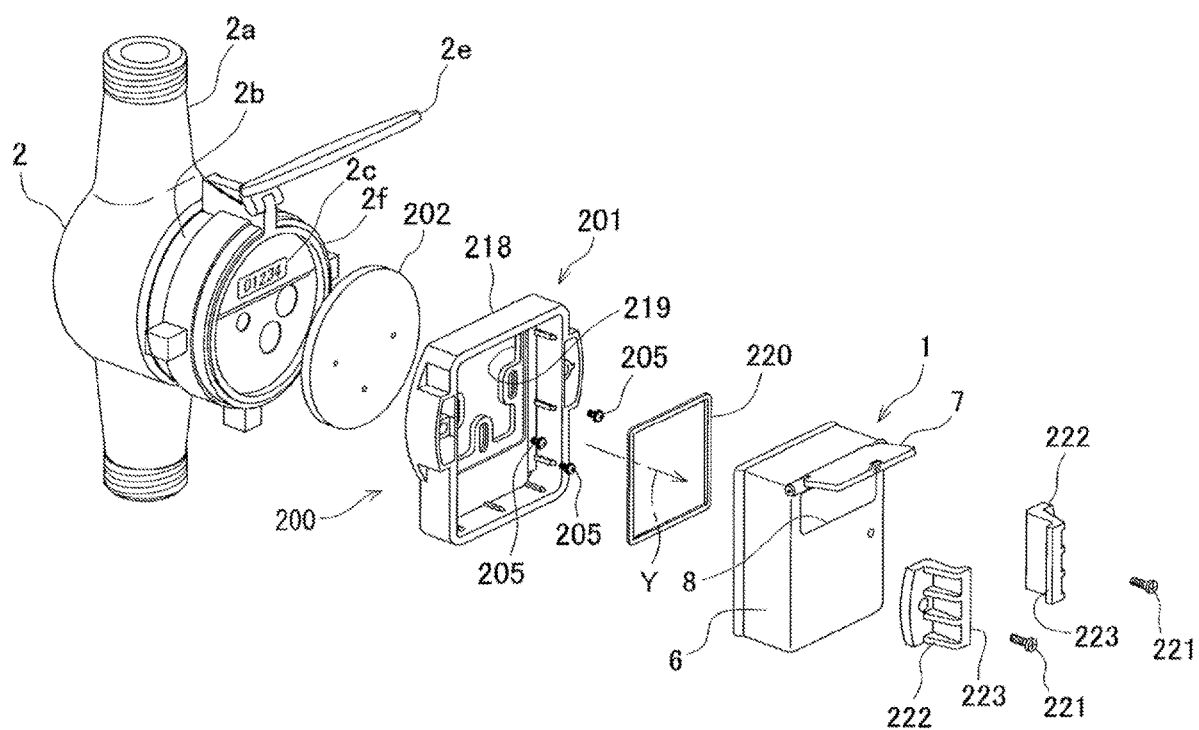
FIG. 22 is an exploded view of the attachment member (200) together with the meter reading device (1) and the meter device (2).

FIG. 20 to FIG. 22 are a front view, a sectional view, and an exploded view of an attachment member 200. The attachment member 200 enables attachment of the meter reading device 1 to the meter device 2. The attachment member 200 includes a holding frame 201 that holds the meter reading device 1. Further, the attachment member 200 is connected to the holding frame 201, and has a transparent fixed plate 202 that is removably fixable to the meter device 2.

Further, with reference to FIG. 20 to FIG. 22, a specific example of a structure of the attachment member 200 is described. The transparent fixed plate 202 has screw holes 206, and is fixed to a bottom surface of the holding frame 201 with use of fixing screws 205. The transparent fixed plate 202 is provided to project from the bottom surface of the holding frame 201. The transparent fixed plate 202 is formed in a shape slightly smaller than an inner edge shape of a peripheral wall 2f formed at an outer periphery of the display surface 2c of the meter device 2. Thus, the holding frame 201 and the meter reading device 1 can be removably attached to the meter device 2 by fitting the transparent fixed plate 202 fixed to the holding frame 201 into the peripheral wall 2f.

The attachment member 200 including the transparent fixed plate 202 can be attached even when the meter device 2 does not have a grippable structure at its outer periphery.

Further, FIG. 22 is an exploded perspective view of an example of the attachment member 200. As illustrated in this example, when the transparent fixed plate 202 is formed in a disc-like shape, and the holding frame 201 and the meter reading device 1 are attached to the meter device 2 with the peripheral wall 2f having a circular inner edge shape, the attachment member 200 can be attached after an angular position about the axis Y perpendicular to the plane of the opening 9 of the meter reading device 1 as a rotation axis is adjusted to a suitable angle. More specifically, when a shift in angular position about the axis Y as the rotation axis occurs, the angular position can easily be adjusted while the display surface 2c is viewed through the check window 8 and the opening 9. Even when, in particular, the meter device 2 does not have the above-mentioned protruding portions 2d on the outer peripheral wall, the transparent fixed plate 202 allows the meter reading device 1 to be attached at a proper angular position by using the peripheral wall 2f of the meter device 2.

A failure probability in reading when the meter reading device 1 picks up an image of the measurement value and reads the measurement value can be reduced by adjusting the angular position.

The holding frame 201 includes a frame portion 218. The frame portion 218 allows the meter reading device 1 to be fitted thereinto. Further, the frame portion 218 has an open window 219 that is formed to pass through a bottom surface of the frame portion 218. The open window 219 is formed at a position that allows the open window 219 to communicate with the check window 8 and the opening 9 of the meter reading device 1 fitted into the frame portion 218. The open window 219 allows the measurement value displayed on the display surface 2c of the meter device 2, to which the attachment member 200 is mounted, to be visually checked through the check window 8 of the meter reading device 1 fitted into the frame portion 218.

In this embodiment, the bottom surface of the frame portion 218 has a lower-level portion around the open window 219, and the lower-level portion allows a frame-shaped ring 220 to be fitted therein. The fitting of the frame-shaped ring 220 prevents water intrusion into the open window 219 along a peripheral surface of the meter reading device 1 fitted into the frame portion 218.

Further, the meter reading device 1 fitted into the frame portion 218 is pressed toward the bottom surface of the frame portion 218 by fixing claws 222, and is fixed thereto. The fixing claws 222 can be fixed to the holding frame 201 with use of screws 221. Each of the fixing claws 222 has a claw piece 223. The claw piece 223 extends radially inward over a flat surface end of the frame portion 218 in a state of being fixed with a screw. The claw pieces 223 are brought into pressure contact with a flat surface of the meter reading device 1 to fix the meter reading device 1.

[Attachment Member 300]

Figure 23:
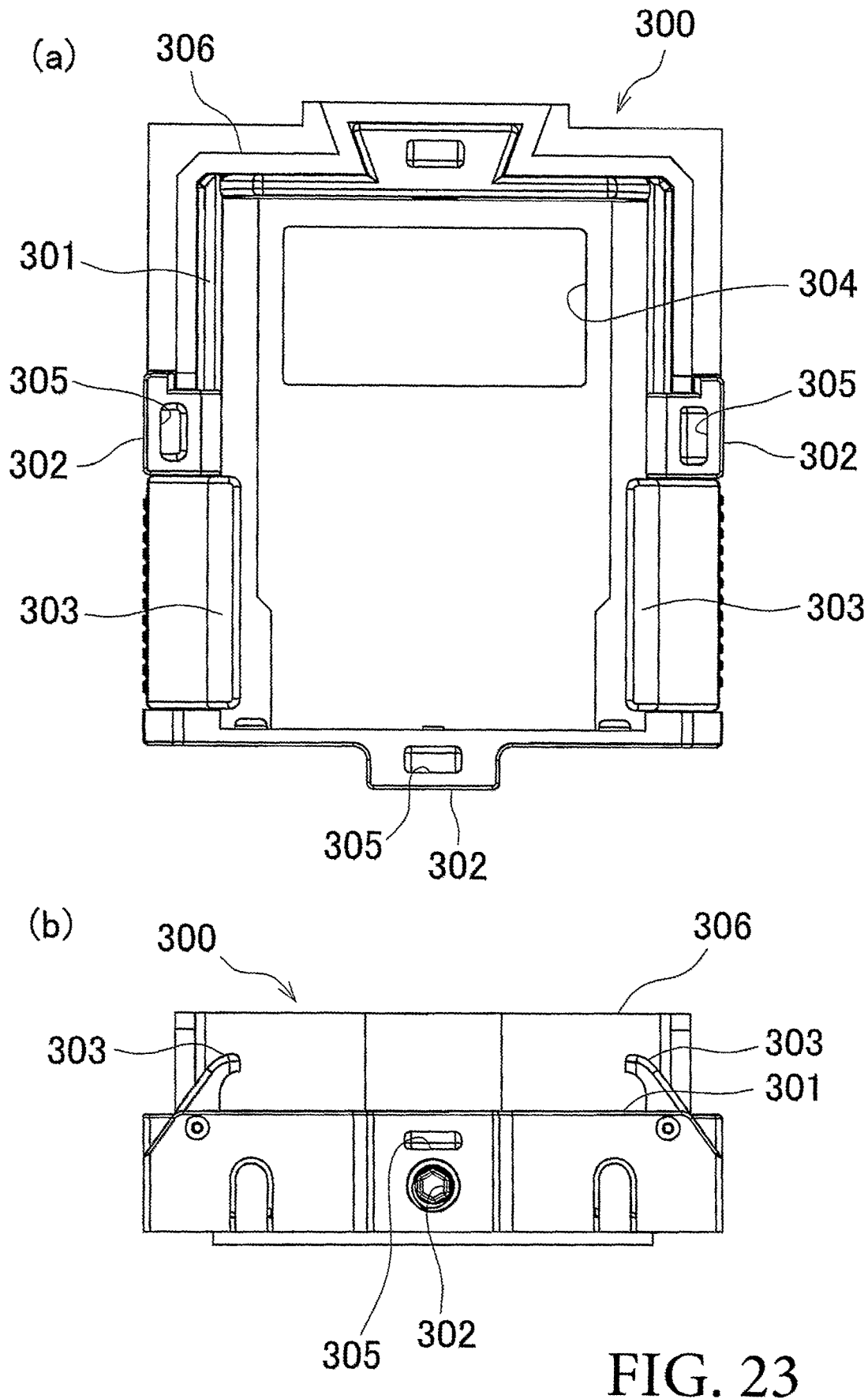
FIG. 23(a) is a front view of an attachment member (300)
FIG. 23(b) is a bottom view of the attachment member (300).

FIG. 23 is a perspective view for illustrating a state in which the meter reading device 1 is attached to an attachment member 300. The attachment member 300 enables attachment of the meter reading device 1 to the meter device 2. The attachment member 300 includes a holding frame 301 that holds the meter reading device 1.

Figure 24:
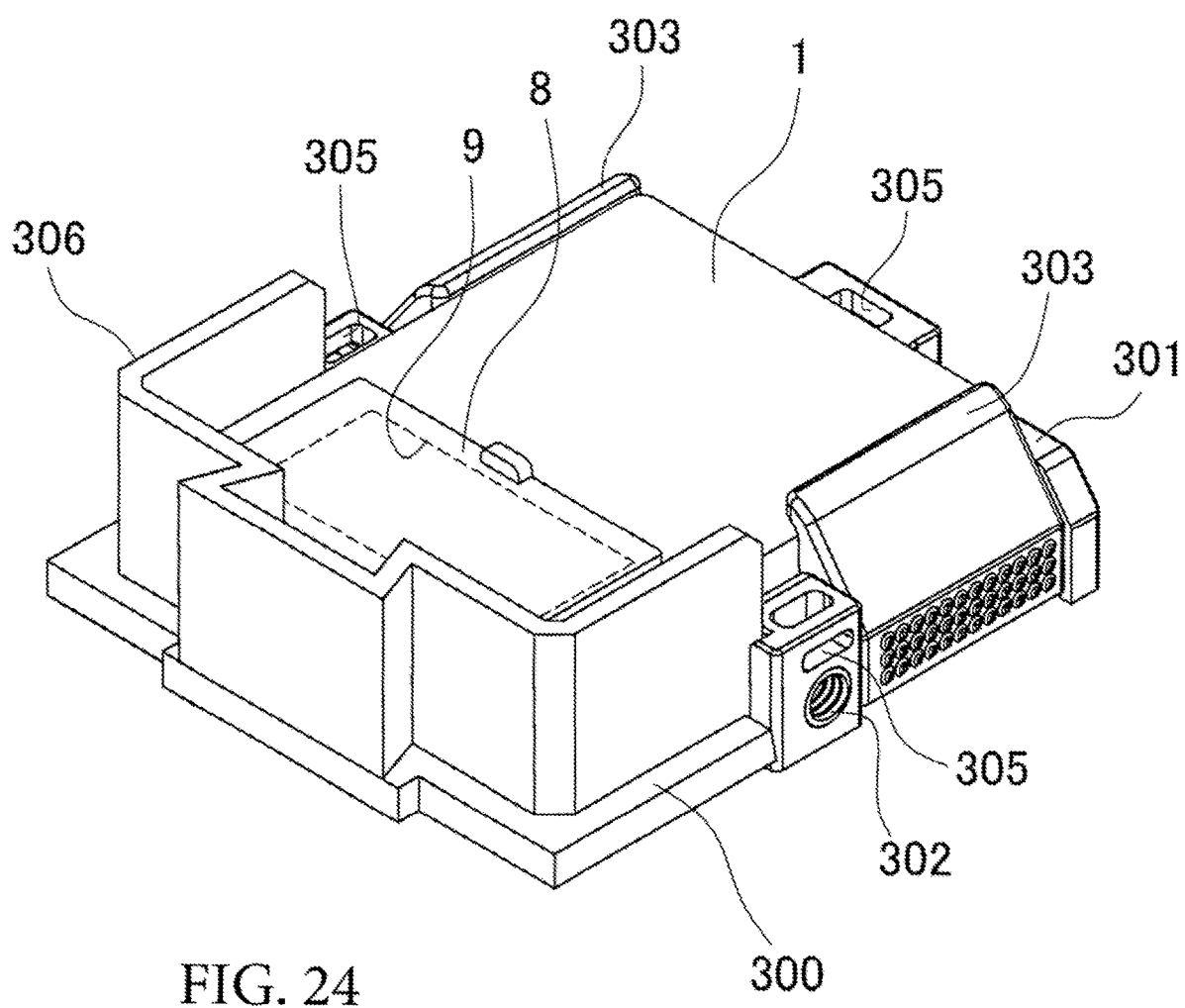
FIG. 24 is a perspective view of the attachment member (300).
Figure 25:
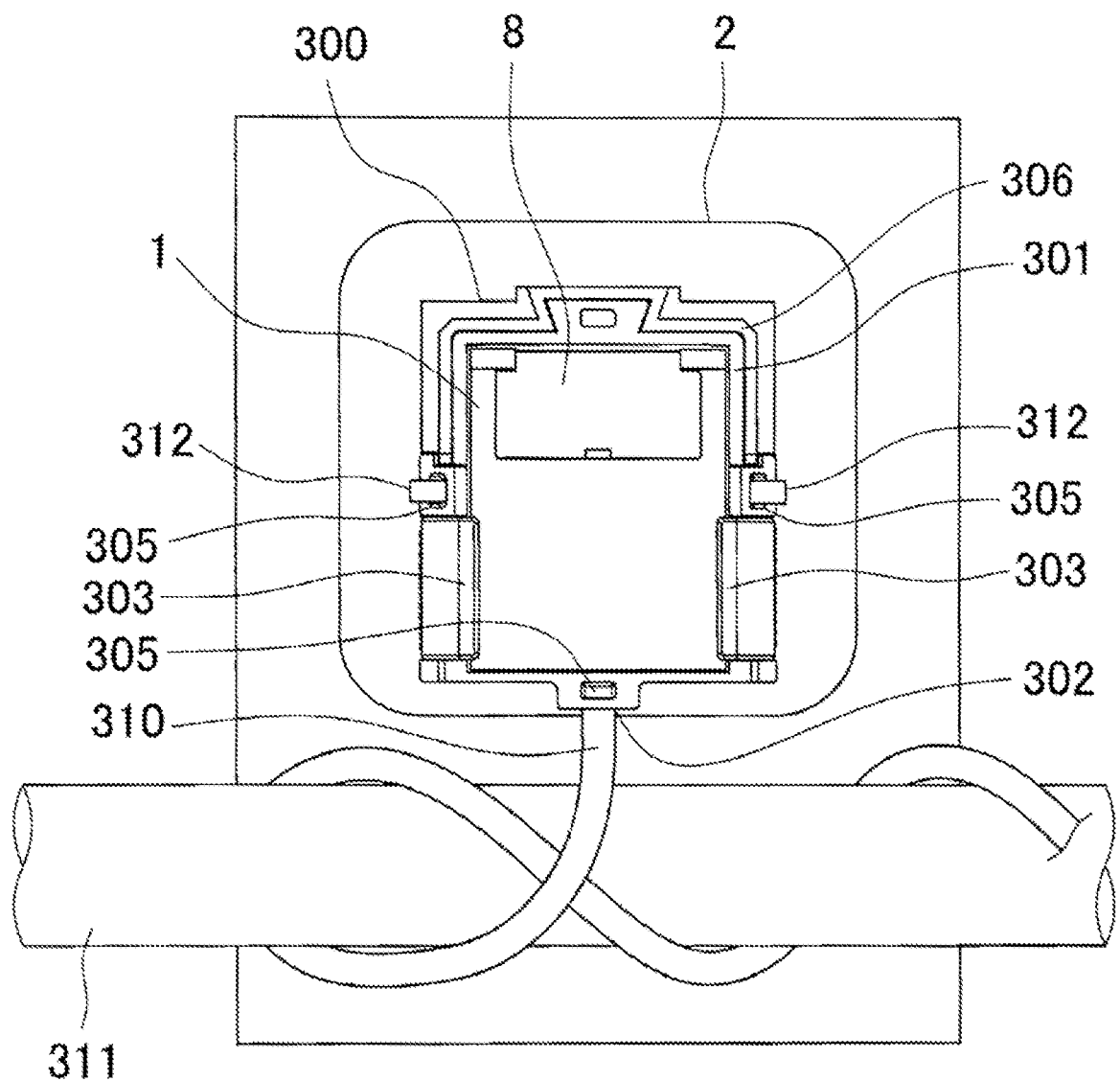
FIG. 25 is a view for illustrating a state in which a fixing tool (310) that is flexible and has an elongated shape is mounted to the attachment member (300) and is wound around an obstacle (311) to be fixed thereto.

Further, with reference to FIG. 23, a specific example of a structure of the attachment member 300 is described. The holding frame 301 has a fixing screw hole 302 formed in its outer peripheral surface. It is preferred that the fixing screw hole 302 have a size and threads in conformity with standards used to fix a common tripod. The fixing screw hole 302 described above enables mounting of various fixing tools 310, which have been developed for fixing a camera device, into the fixing screw hole 302. Even when there is an obstacle 311 such as a pipe in proximity to the meter device 2 and the obstacle 311 prevents the meter reading device 1 from being directly fixed to the meter device 2, as illustrated in FIG. 24, the attachment member 300 having the fixing screw hole 302 enables the meter reading device 1 to be held while the meter reading device 1 is being in contact with a front surface of the meter device 2. As a result, an image of the measurement value displayed on the meter device 2 can be picked up, and the measurement value can be read.

It is preferred that a plurality of fixing screw holes 302 be formed in the outer peripheral surface of the holding frame 301. The plurality of fixing screws holes 302 are preferred because the fixing tool 310 can be mounted into a suitable one of the fixing screw holes 302 in accordance with conditions such as a positional relationship with respect to the obstacle 311.

The holding frame 301 has fixing claws 303. When the meter reading device 1 is fitted into the holding frame 301, the fixing claws 303 are hooked to hold on an upper surface of the meter reading device 1 to fix the meter reading device 1. Further, the holding frame 301 has a bottom surface with an open window 304 that is formed to pass through the bottom surface. The open window 304 is formed at a position that allows the open window 304 to communicate with the check window 8 and the opening 9 of the meter reading device 1 fitted into the holding frame 301. The open window 304 allows the measurement value displayed on the display surface 2c of the meter device 2, to which the attachment member 300 is mounted, to be visually checked through the check window 8 of the meter reading device 1 fitted into the holding frame 301.

Further, the holding frame 301 has belt insertion holes 305 formed in its outer peripheral surface. A fixing belt 312 can be inserted through the belt insertion holes 305. It is preferred that a plurality of belt insertion holes 305 be formed in the outer peripheral surface of the holding frame 301, in particular, be formed at positions corresponding to opposed sides of the holding frame 301, respectively. The fixing belt 312 caused to pass through the belt insertion holes 305 can be fixed by being looped over, for example, protruding portions of the meter device 2. Further, when the fixing belt 312 is wound around a body portion of the meter device 2 to bundle the holding frame 301 and the meter device 2 together, the holding frame 301 and the meter device 2 can be fixed together with a tensile force. Further, when a plurality of belt insertion holes 305 are formed, the holding frame 301 and the meter device 2 can be fixed under a state in which a back surface of the holding frame 301 is in close contact with a front surface of the meter device 2. It is also preferred that the belt insertion holes 305 be formed in an outer peripheral surface of the holding frame 101, 201 of the attachment member in other modes, such as the attachment members 100 and 200.

Further, it is preferred that a light-blocking cover be provided to the attachment member 100, 200, 300 according to the present invention so as to be in connection with the holding frame 101, 201, 301. The light-blocking cover is formed with a height in a vertical direction larger than a height of the front surface of the meter device 2 being mounted to the holding frame 101, 201, 301 along the holding frame. The light-blocking cover can prevent external light such as sunlight from entering the opening 9 of the meter reading device 1, and can also prevent a reduction in visibility of a character displayed on the display surface 2c of the meter reading device 1, which may be caused by scattering of external light. Thus, it is preferred that the light-blocking cover be formed at an upper end portion of the holding frame. The light-blocking cover is provided at the above-mentioned position because, in many cases, the meter device 2 is placed with the display surface 2c being vertical so as to increase visibility. In this case, the front surface of the meter reading device 1 is generally vertical with respect to a horizontal plane when the meter reading device 1 is in a mounted state. Thus, in an outdoor environment, the light-blocking cover can prevent sunlight emitted from above from being incident on the meter reading device 1. Further, the light-shieling cover may be formed integrally with the attachment member. However, the light-blocking cover may also be formed as a separate member, and may be mountable to the holding frame through fixing with screws.

Figure 26:
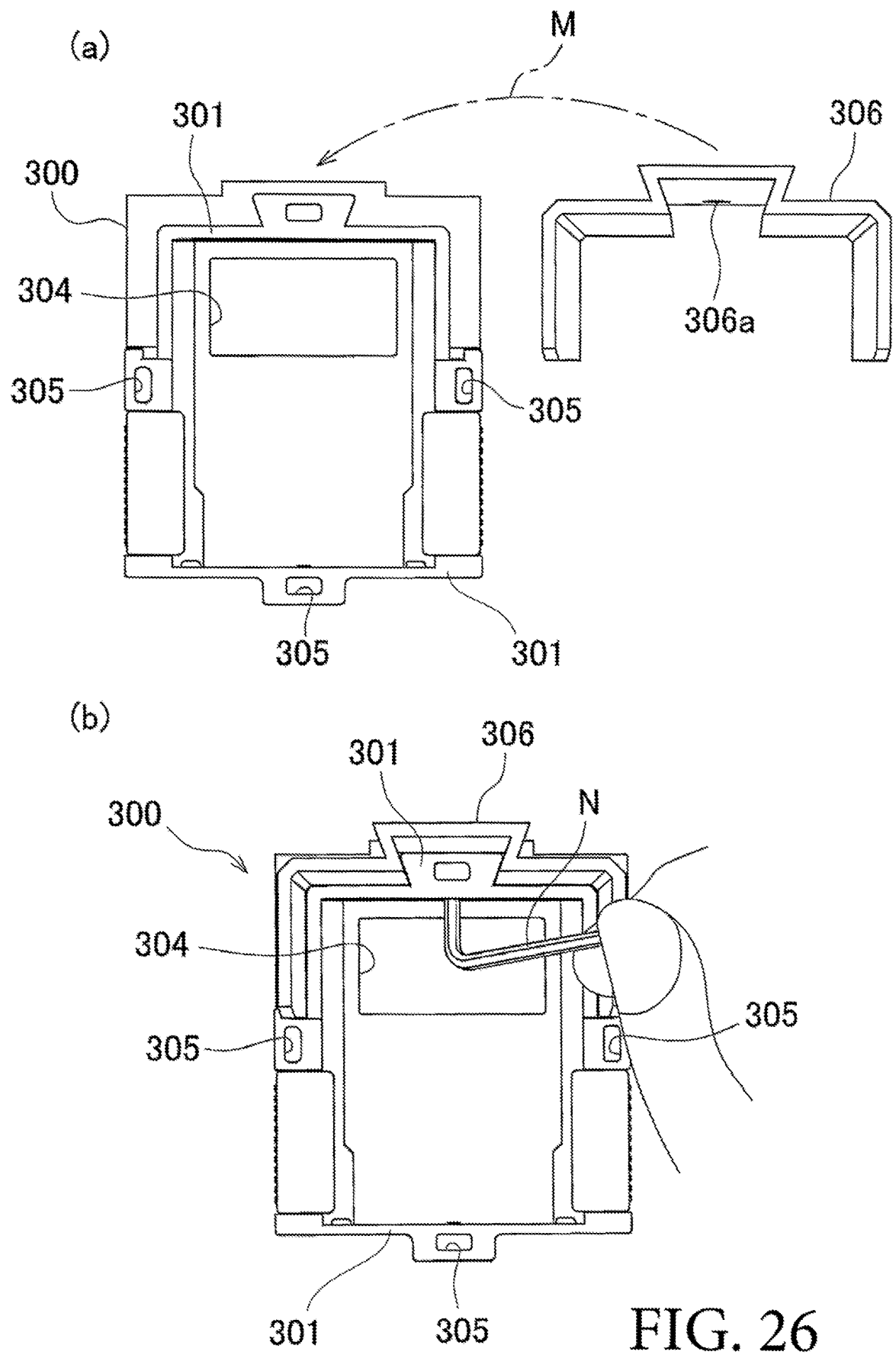
FIG. 26 are views for illustrating a state in which a light-blocking cover (306) is mounted to a holding frame (301).

Now, a light-blocking cover 306 that is mountable to the attachment member 300 is described as an example. As illustrated in FIG. 26(a), the light-blocking cover 306 is formed in a U-shaped wall-like member. The light-blocking cover 306 has a height larger than that of the holding frame 301, and has an inner peripheral surface with a shape in conformity with an outer peripheral surface of the holding frame 301. An example of a method of mounting the light-blocking cover 306 to the attachment member 300 is illustrated in FIG. 26(a) and FIG. 26(b). After the light-blocking cover 306 is brought into contact with the outer peripheral surface of the holding frame 301 as indicated by an arrow M in FIG. 26(a), a fixing screw (not shown) is inserted from an inside of the holding frame 301 into a screw hole with use of a hexagonal wrench N. In this manner, the fixing screw can be threadably engaged with a screw hole 306a formed in an inner surface of the light-blocking cover 306. As a result, the light-blocking cover 306 can be fixed to the attachment member 300 (FIG. 26(b)).

Further, it is preferred that a transparent resin sheet be provided as an auxiliary member for the attachment member 100, 200, 300 according to the present invention. The transparent resin sheet is formed slightly larger than the display surface 2c of the meter device 2, and has front and back surfaces, both being adhesive. The back adhesive surface of the transparent resin sheet is an adhesive mounting surface that is adhesive to the display surface 2c. Before the attachment member is mounted to the meter device 2, the transparent resin sheet is bonded in advance so that the adhesive mounting surface covers the display surface 2c. Then, the front adhesive surface of the transparent resin sheet is bonded to a transparent plate that is mounted in advance to the open window of the attachment member. In this manner, occurrence of dew condensation or water intrusion between the attachment member and the display surface 2c can be prevented, preventing a reduction in visibility of a character displayed on the display surface 2c of the meter reading device 1. It is preferred that the transparent resin sheet be made of a transparent acrylic resin. The acrylic resin is used because of its high transparency to visible light. Further, in a case in which the attachment member 200 is used, the transparent plate may also be the transparent fixed plate 202.

Figure 27:
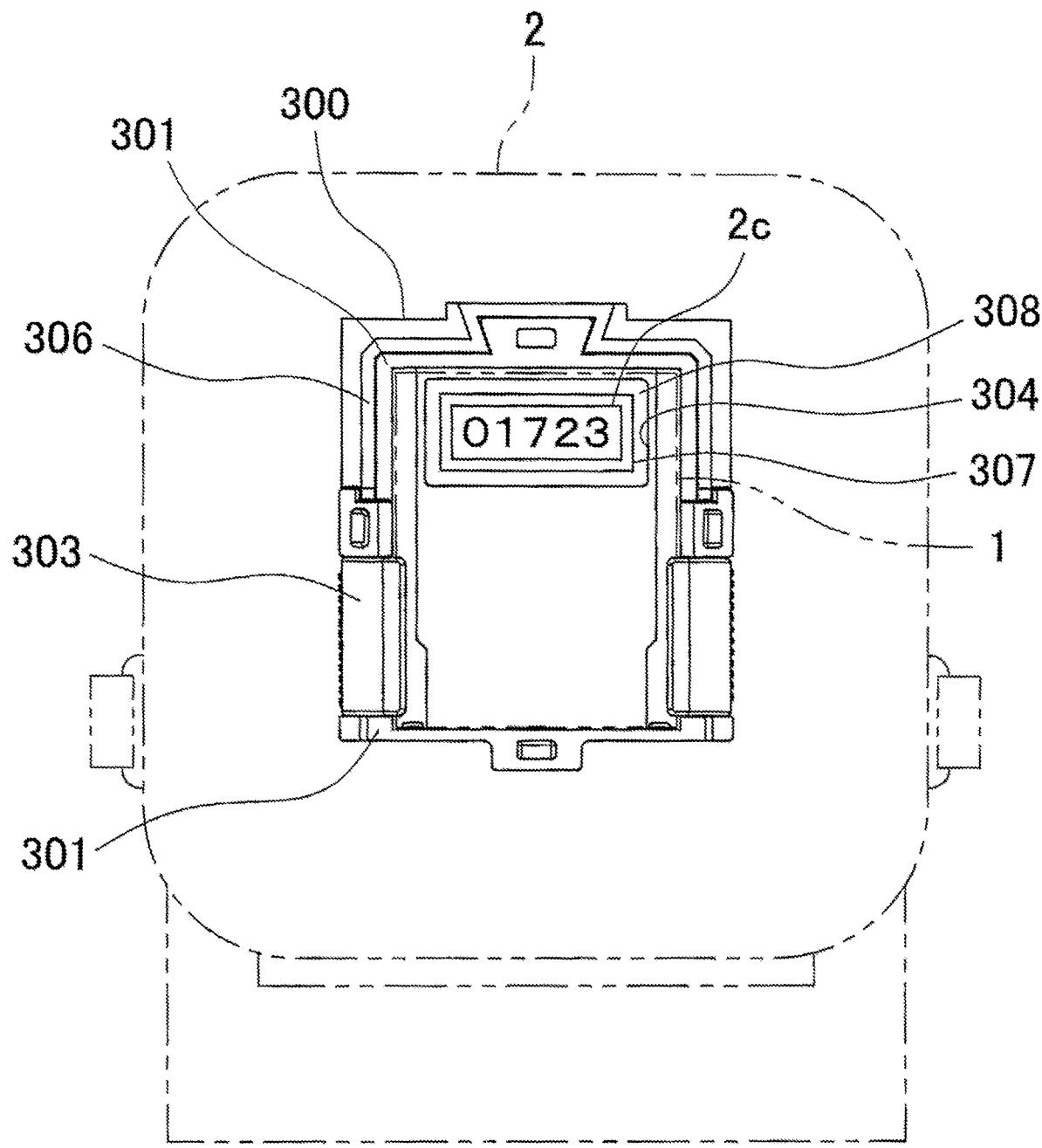
FIG. 27 is a front view for illustrating a state in which a transparent resin sheet (307) is mounted between a display surface (2c) and a transparent plate (308) of the attachment member (300).
Figure 28:
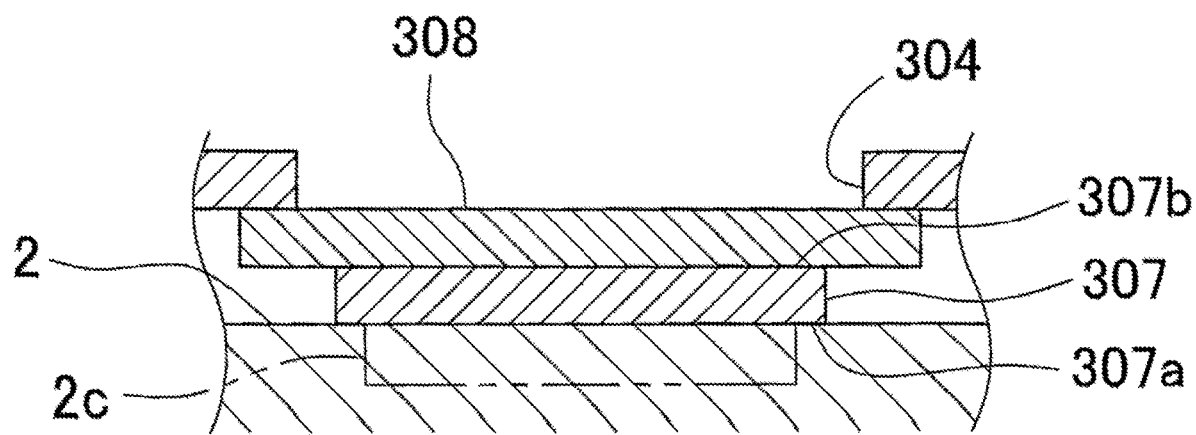
FIG. 28 is an end view of the transparent resin sheet (307), the display surface (2c) and the transparent plate (308), which are bonded to an upper surface and a lower surface of the transparent resin sheet (307), and an area therearound, which are taken horizontally and viewed in an upward direction.

Now, the transparent resin sheet is described taking the attachment member 300 as an example. A transparent resin sheet 307 has adhesive front and back surfaces. As illustrated in FIG. 27 and FIG. 28, the transparent resin sheet 307 is bonded so that an adhesive mounting surface 307a on a back side covers the display surface 2c of the meter device 2. Further, a transparent plate 308 is provided to an open window 304 of the attachment member 300 according to this embodiment so as to cover a rear-surface side opening of the open window 304. An adhesive surface 307b of the transparent resin sheet 307 on a front side is bonded to a back surface of the transparent plate 308 so as to be in close contact therewith. The transparent resin sheet 307 bonded between the display surface 2c and the transparent plate 304 can prevent dew condensation and water intrusion between the attachment member 300 and the display surface 2c, and thus can prevent a reduction in visibility of a character displayed on the display surface 2c of the meter reading device 1.

REFERENCE SIGNS LIST 1 meter reading device
2 meter device
6 casing
8 check window
9 opening
10 mirror
13 camera
14 illumination device
15 board
17 recognition unit
18 transmission unit
19 storage device
20 terminal device
23 remote meter reading system
100 attachment member
101 holding frame
102 fixing member
108 gear-like uneven structure
112 annular rotatable ring
115 small protruding portion
122 fixing claw 200 attachment member
202 transparent fixed plate

The invention claimed is:

1. An attachment member that enables attachment of a meter reading device to an existing meter device having a display surface, which measures usage of an energy supply medium of water, gas, or electricity and displays a measurement value on the display surface, the meter reading device including a casing having a rear surface with an opening and a camera provided inside the casing to read the measurement value displayed on the display surface through the opening, the attachment member comprising:

a holding frame capable of holding the meter reading device, which has an open window formed at a position that allows the open window to communicate with the opening; and a fixing member having a hollow annular shape, which is connected to the holding frame and includes gripping portions being removably fixable to the meter device, wherein the holding frame is connected to the fixing member so as to be turnable about an axis perpendicular to a plane opposed to the display surface as a rotation axis with respect to the fixing member.

* * * * *